United States Patent
Iwasaki et al.

(10) Patent No.: US 6,329,035 B1
(45) Date of Patent: Dec. 11, 2001

(54) OPTICAL DATA STORAGE MEDIUM CAPABLE OF REVERSIBLY DISPLAYING INFORMATION

(75) Inventors: Hiroko Iwasaki, Tokyo; Kenichi Aihara, Numazu; Kyohji Hattori, Ebina; Akihiko Okamoto, Kawasaki; Yoshihiko Hotta, Mishima; Naoshi Mishima, Tokyo; Tetsuo Watanabe, Yokohama, all of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/272,686

(22) Filed: Mar. 19, 1999

(30) Foreign Application Priority Data

Jul. 28, 1998 (JP) .................................................. 10-213227

(51) Int. Cl.$^7$ ...................................................... B32B 3/02
(52) U.S. Cl. ...................... 428/64.1; 428/64.4; 428/64.8; 428/913; 430/270.11
(58) Field of Search ................................... 428/64.1, 64.2, 428/64.4, 64.8, 65.2, 457, 913; 430/270.11, 495.1, 945; 369/283

(56) References Cited

U.S. PATENT DOCUMENTS 5,521,371 * 5/1996 Hotta et al. ........................... 235/487
5,858,496 * 1/1999 Ohkubo et al. ...................... 428/64.1

* cited by examiner

Primary Examiner—Elizabeth Evans
(74) Attorney, Agent, or Firm—Cooper & Dunham LLP

(57) ABSTRACT

An optical data storage medium includes a substrate, an optical data storage layer overlaid on the substrate and a reversible image recording layer overlaid on the optical data storage layer, in which information is recorded in the reversible image recording layer so as to be visible. The reversible image recording layer, which includes a matrix resin and a low-molecular-weight organic substance dispersed in the matrix resin, may preferably be thermosensitive and change its transparency or color tone in response to heat.

31 Claims, 7 Drawing Sheets

7: REVERSIBLE THERMOSENSITIVE RECORDING LAYER
6: INTERMEDIATE LAYER
5: REFLECTIVE/HEAT DISSIPATING LAYER
4: SECOND DIELECTRIC LAYER
3: OPTICAL DATA RECORDING LAYER
2: FIRST DIELECTRIC LAYER
1: SUBSTRATE
8: HARD COAT LAYER

OPTICAL DATA STORAGE MEDIUM CAPABLE OF REVERSIBLY DISPLAYING INFORMATION

BACKGROUND

1. Field

The present invention relates to an optical data storage medium capable of reversibly displaying information and a process of recording information for displaying on the medium.

2. Discussion of the Background

The importance of electronic data storage media in computer equipment for storing, recording and rewriting data has been increasing, in the office, home and in other environments. Such electronic data storage media include, for example, magnetic tapes; floppy disks; magneto-optic disks; compact-discs digital-audio (CD-DAs), compact disc-read-only-memory (CD-ROM), CD-Recordable (CD-Rs), CD-Rewritable (CD-RWs) and other compact disc (CD) media; digital video disc-read-only-memory (DVD-ROMs), digital video disc-recordable (DVD-Rs), digital video disc-random access memory (DVD-RAMs) and other DVD media; IC memory cards; optical cards; transportable hard discs and various other media. In addition, the types and volume of data stored in individual media have increased with increasing storage capacities. The demand has increased for optical data storage media in which data is stored and read by means of lasers.

Descriptions and volume names for the data stored in electronic data storage media are recorded as user readable indexes for the data. For such index recording, conventionally, an index label in the form of a sticker is applied onto a disc cartridge. For example, Japanese Laid-Open Patent Application (referred to as JPA, hereinafter) No. 9-282836 proposes a process of rewriting and displaying information as indexes for the stored data by using a liquid crystal/polymer composite film as an index label. In compact discs, however, the CD itself is separately used without a cartridge; if such a liquid crystal/polymer composite film is provided on the surface of the disc, the rotation of the disc is adversely affected and data might not, be reliably read or written by a laser light.

CD-ROMs, on which data have already been recorded in a production process, are used as read-only optical data storage media. In the case of CD-ROMs, indexes or various design patterns indicating the contents of stored data are printed on their protective layers with an ultraviolet-curing ink or an oil-based ink. Such indexes or design patterns are generally printed by screen printing, offset printing or other printing techniques, which are suitable for rapidly and efficiently printing the same pattern in a so-called mass printing process.

Write-once-read-many optical data storage media, such as CD-Rs, on which data can be recorded by a laser only once and the recorded data can be reproduced with a CD player, have been developed, and users have stored their own data for personal use, such as music and computer data, on CD-Rs. The CD-Rs generally have no description or only have some common characters or design patterns on their surfaces printed with an ultraviolet-curing ink or an oil-based ink. For adding description for such data for personal use, there have been proposed a process of writing the description as an index or other design patterns on a protective layer of the medium with an oil-based felt-tipped pen, for example, a process of applying a thin label onto the medium for writing the description thereupon, a process of providing an ink-accepting layer on the surface of a medium and recording the description by an ink-jet recording method (JPA-5-238005) and a process of providing a dye-accepting layer on the surface of a medium and recording the description by a sublimation thermal transfer recording process (JPA-8-48080). Each of the above processes may be carried out before or after optically recording personal data on an optical data storage medium.

Recently, optical data storage media in which stored data can be rewritten by a laser, such as CD-RWs, have been developed and come into use. When indexes or design patterns are recorded on the surface of these CD-RWs with a felt-tipped pen, by ink-jet recording or a thermal transfer recording method as in CD-Rs, such indexes or design patterns cannot be conveniently changed when the stored data is changed. In this case, the stored data can be inconsistent with the indexes and design patterns printed on the surface of the CD-RWs and hence the contents of the stored data cannot be easily recognized by the indexes and design patterns. When a thin label such as used in CD-Rs is applied onto these CD-RWs, and later the label is replaced with another label in accordance with changes of the stored data, the media may be scratched or otherwise damaged.

SUMMARY

The product and process disclosed in this patent specification take into account the above-discussed problems and address and solve the above-discussed and other problems. Preferred embodiments provide an optical data storage medium capable of reversibly displaying information and a process of recording information that a user can read, by which a description for stored data in the medium can be visually recognized and the description can be readily recorded, erased or rewritten, without damaging the medium.

According to a preferred embodiment, an optical data storage medium (hereinafter may be briefly referred to as "medium") includes a substrate, an optical data storage layer overlaid on the substrate and a reversible image recording layer overlaid on the optical data storage layer. Information is recorded in the reversible image recording layer so as to be visually recognizable.

The reversible image recording layer may preferably be thermosensitive and change its transparency and/or color in response to heat.

The substrate in the above medium may include a resin and the glass transition temperature Tg of the resin and a recording temperature Tr of the reversible image recording layer may have the following relationship:

$$Tr \leq 1.6 \times Tg \quad (1)$$

wherein Tr is the recording temperature (° C.) of the reversible image recording layer, and Tg is the glass transition temperature (° C.) of the resin.

The glass transition temperature Tg of the substrate and the recording temperature Tr of the reversible image recording layer may have the following relationship:

$$Tr \leq 1.3 \times Tg \times \{(Lr+Ld)/(Lr+0.8 \times Ld)\} \quad (2)$$

wherein Tr is the recording temperature (° C.) of the reversible image recording layer, Tg is the glass transition temperature (° C.) of the substrate, Lr is the thickness ($\mu$m) of the reversible image recording layer, and Ld is the distance ($\mu$m) from a face of the substrate facing the reversible image recording layer to a face of the reversible image recording layer facing the substrate.

The recording temperature Tr of the reversible image recording layer in the medium may preferably be equal to or higher than about 120° C.

The reversible image recording layer in the medium may include a matrix resin and a low-molecular-weight organic substance dispersed in the matrix resin and reversibly change its transparency in response to heat.

In the above medium, the low-molecular-weight organic substance may include a low-molecular-weight organic substance having a melting point equal to or higher than about 100° C. and equal to or lower than 1.6 times the glass transition temperature Tg of the substrate.

The low-molecular-weight organic substance may include at least two low-molecular-weight organic substances, the melting points of which differ from each other by at least about 30° C.

The reversible image recording layer in the medium may include an electron donating color-displaying compound and an electron accepting compound which colors the electron donating color-displaying compound.

In the medium mentioned immediately above, the electron donating compound may include an electron donating compound having a melting point equal to or higher than about 120° C. and equal to or lower than 1.6 times the glass transition temperature Tg of the substrate.

The substrate in the medium may have a glass transition temperature Tg ranging from about 100° C. to about 180° C.

The medium may have a warping angle equal to or less than ±0.6 degree and a warping amount equal to or less than 0.4 mm.

The medium may preferably include a support and an adhesive layer between the reversible image recording layer and the optical data storage layer, and in this case the reversible image recording layer is adhered to the optical data storage layer.

In the medium, the information recorded in the reversible image recording layer may include a bar code.

A light-reflecting layer may be provided between the reversible image recording layer and the optical data storage layer in the medium.

In the medium just mentioned above, the light-reflecting layer may have a function of reflecting a laser beam and preventing overheating of the optical data storage layer.

A surface of the medium facing the reversible image recording layer may have a Ten-Point Mean Roughness (Rz) ranging from 0.3 to 3.0 $\mu$m as determined according to Japanese Industrial Standards (JIS) B0601.

A surface of the medium facing the reversible image recording layer may have an Arithmetical Mean Deviation of the Profile (Ra) ranging from 0.05 to 1.0 $\mu$m as determined according to Japanese Industrial Standards (JIS) B0601.

In the medium, the reversible image recording layer may be formed overlaying an area of the surface of the optical data storage layer and an irreversible image recording layer may be formed overlaying another area of the optical data storage layer.

In the medium mentioned immediately above, the irreversible image recording layer may include a hydrophilic surface to which an aqueous-based ink can be fixed.

The irreversible image recording layer may have an accepting layer on which an image can be formed and fixed by a thermal transfer recording method.

The present patent specification also provides a process for recording information on an optical data storage medium. The process includes the steps of providing an optical data storage medium including a substrate, an optical data storage layer overlaid on the substrate and a reversible image recording layer overlaid on the optical data storage layer, and of recording and/or rewriting information on the reversible image recording layer to make the information visually recognizable.

In the above process, the reversible image recording layer changes its transparency and/or color in response to heat in the recording step.

The information may be recorded and/or rewritten in the reversible image recording layer in the recording step at a temperature equal to or lower than 1.6 times the glass transition temperature of the substrate to make the information visually recognizable.

In the process, the information may be recorded and/or rewritten in the reversible image recording layer at a temperature Tr to make the information visually recognizable, where the temperature Tr (° C.) has the following relationship with the glass transition temperature Tg (° C.) of the substrate:

$$Tr \leq 1.3 \times Tg \times \{(Lr+Ld)/(Lr+0.8 \times Ld)\}$$

wherein Lr is the thickness ($\mu$m) of the reversible image recording layer, and Ld is the distance ($\mu$m) from a face of the substrate facing the reversible image recording layer to a face of the reversible image recording layer facing the substrate.

In the process, the medium may include a reversible image recording layer formed overlaying an area of the surface of the optical data storage layer and an irreversible image recording layer formed overlaying another area of the surface of the optical data storage layer, and the process may include the step of applying a material containing at least a dye or pigment to the irreversible image recording layer to form an image.

In this case, the irreversible image recording layer may include a hydrophilic surface to which an aqueous-based ink can be fixed, and the aqueous-based ink may be applied to the irreversible image recording layer by an ink-jet recording method.

The above material applying step may be performed by a thermal transfer method.

BRIEF DESCRIPTION OF THE DRAWINGS

These and other objects of the product and process disclosed herein will become apparent upon consideration of the detailed disclosures especially when taken with the accompanying drawings in wherein.

DESCRIPTION OF THE PREFERRED EMBODIMENT

Hereinafter the present product and process will be described in detail with reference to several preferred embodiments.

Various optical information storage layers can be used to store information which can be optically read by irradiation of laser light. Layers in which information can be rewritten are preferred. Suitable materials for use in such optical information storage layers include phase-transition storage materials and magneto-optical storage materials. Of these materials, phase-transition storage materials are preferably employed, including so-called chalcogenide materials. More specific examples of such materials include FeTbCo type magneto-optic storage materials, and GeSbTe or AgInSbTe type phase-transition storage materials. Among these materials, AgInSbTe type phase-transition storage materials can preferably be used because of their high recording sensitivities and high erasing ratios.

Figure 1:
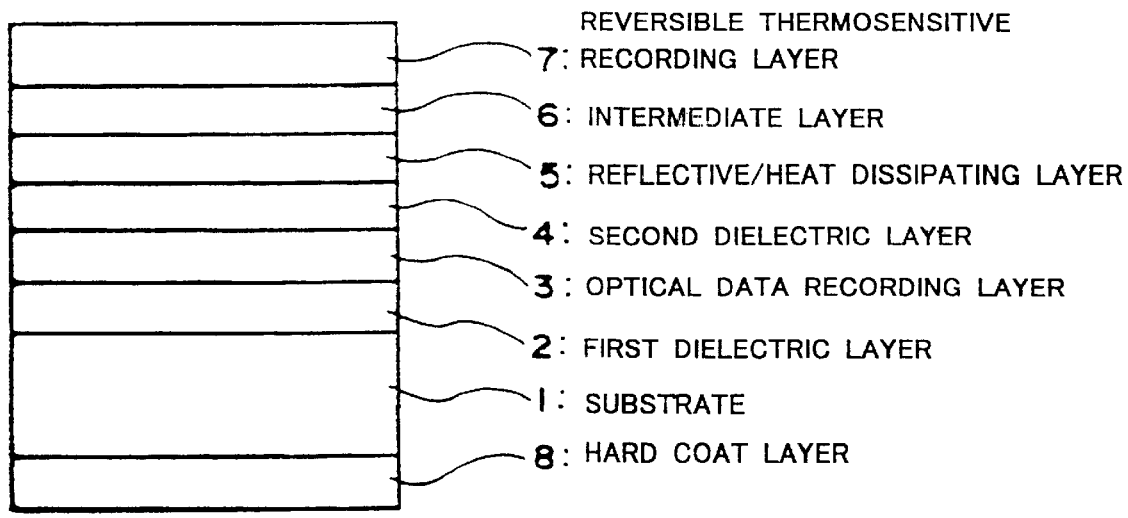
FIG. 1 illustrates a layered structure of an optical data storage medium according to one embodiment.

FIG. 1 illustrates a typical embodiment of an optical information storage medium using an AgInSbTe type phase-transition recording material. The medium has a basic configuration including, a substrate 1 having a guide groove, onto which a first dielectric layer 2, an optical data storage layer 3, a second dielectric layer 4, a reflective/heat-dissipating layer 5, and a reversible image recording layer 7 are provided in this order. The medium may preferably have an intermediate layer 6 between the reflective/heat-dissipating layer 5 and the reversible image recording layer (hereinafter may be briefly referred to as "recording layer") 7, and a hard coat layer 8 on the back of the substrate 1. The dielectric layers 2 and 4 are not necessarily provided on both sides of the optical information storage layer, but the first dielectric layer 2 is preferably provided when the substrate 1 is composed of a material having low heat resistance, such as polycarbonate resins.

The thickness of the optical information storage layer 3 preferably ranges from 5 to 100 nm, more preferably from 10 to 50 nm and even more preferably from 15 to 25 nm. The optical information storage layer 3 can be prepared by sputtering, ion plating, vacuum deposition or plasma chemical vapor deposition (plasma CVD), for instance.

Suitable materials for use as the substrate 1 include glass, ceramics and resins. Among these materials, resins can preferably be employed because of having satisfactory moldability, low cost and light-weight. Specific examples of the resins include polycarbonate resins, acrylic resins, epoxy resins, polystyrene resins, acrylonitrile-styrene copolymeric resins, polyethylene resins, polypropylene resins, silicone resins, fluororesins, acrylonitrile-butadiene-styrene (ABS) resins and urethane resins. Among these resins, polycarbonate resins and acrylic resins are desirable because of having satisfactory processability, optical characteristics and heat resistance.

The substrate 1 is usually disc-shaped. The substrate 1 may be card-shaped or sheet-shaped. The thickness of the substrate 1 is generally 1.2 mm, 0.6 mm or 0.3 mm, but is not limited thereto. A thin substrate is preferred from the viewpoint of the substrate tilt dependency of the cross talk, whereas a substrate having a thickness ranging from about 0.6 mm to about 1.2 mm is preferred in terms of film-formability and yield.

When a resin substrate is employed, the glass transition temperature Tg of the resin preferably ranges from 100° C. to 200° C. and more preferably from 120° C. to 180° C. When the glass transition temperature Tg of the constitutive resin of the substrate is lower than 100° C., the substrate can deform undesirably readily. When it exceeds 200° C., molding the resin can be difficult. The glass transition temperature, Tg, of the constitutive resin of the substrate is usually determined according to any one of a number of known techniques, including dynamic viscoelasticity analysis and differential scanning calorimetry (DSC). In the dynamic viscoelasticity analysis, a temperature at which tan δ or E" has a peak value is believed to be the glass transition temperature Tg.

Suitable materials for use in the first dielectric layer 2 and second dielectric layer 4 include SiO, $SiO_2$, ZnO, $SnO_2$, $Al_2O_3$, $TiO_2$, $In_2O_3$, MgO, $ZrO_2$ and other oxides; $Si_3N_4$, AlN, TiN, BN, ZrN and other nitrides; ZnS, $In_2S_3$, $TaS_4$ and other sulfides; SiC, TaC, $B_4C$, WC, TiC, ZrC and other carbides, and diamond-like carbon; or mixtures of these substances. These layers can be prepared by sputtering, ion plating, vacuum deposition, plasma CVD or the like. The thickness of the first dielectric layer 2 preferably ranges from 50 to 500 nm, more preferably from 100 to 300 nm and even more preferably from 150 to 250 nm, and the thickness of the second dielectric layer 4 preferably ranges from 5 to 200 nm, and.more preferably from 10 to 50 nm.

Suitable materials for use in the reflective/heat-dissipative layer 5 include Al, Ag, Au or other metals, and metals in which the metals mentioned above are incorporated with Ti, Cr, Si, Ta or other additive elements. The reflective/heat-dissipating layer 5 can be manufactured by, for example, sputtering, ion plating, vacuum deposition or plasma CVD. The thickness of the layer 5 preferably ranges from 30 to 300 nm, more preferably from 50 to 250 nm and even more preferably from 70 to 200 nm.

The intermediate layer 6 can be provided if desired, and preferably be composed of a material containing a resin as a major ingredient. Ultraviolet crosslinking resins containing an acrylic or methacrylic monomer as a major ingredient are preferably used. The intermediate layer 6 can be prepared by spin coating or other coating techniques. It serves to protect the optical information storage layer 3 and the reflective/heat-dissipating layer 5, and to bond the recording layer 7 with the reflective/heat-dissipating layer 5 and other layers. The thickness of the intermediate layer 6 is preferably from 0.5 to 20 μm and more preferably from 1.0 to 15 μm.

Suitable materials for use in the record layer 7 include electrochromic materials, photochromic materials, thermochromic materials, magnetic recording materials, bistable liquid crystal materials, reversible thermosensitive recording materials. Of these materials preferred are reversible thermosensitive recording materials which achieve a state (1) having a transparency (1) or a color tone (1) upon application of heat energy, and achieve a state (2) having a transparency (2) or color tone (2) upon application of the same or different heat energy. At this point, materials in which the state (1) or (2) can be retained without applying energy are preferable. Suitable energy useful for recording information in the recording layer 7 includes light, heat, an electric field and magnetism. Among these energies, heat energy can preferably be used, because of having satisfactory stability and low cost.

Hereinafter a reversible-thermosensitive-type recording layer 7 (referred to as a reversible thermosensitive recording layer) is explained.

The reversible thermosensitive recording layer 7 may preferably have a thickness, which depends on the material used, ranging from 0.5 to 300 μm, more preferably from 1.0 to 100 μm and even more preferably from 2.0 to 30 μm.

Any materials which reversibly change their transparency or color tone by heat can be used as the reversible thermosensitive recording layer 7. Preferred are those which can retain two or more states having different color tone and/or transparency at room temperature without applying energy. Such materials include, for example, a composition including two or more polymers, which changes its transparency from transparent to opaque using the change of the compatibility of the polymers (JPA-61-258853), a liquid crystal polymer having a property of changing its phase (JPA-62-66990, from page 2, right upper column, line 3 to page 4, left upper column, line 17), a substance which achieves a color (1) at a first specified temperature higher than room temperature and achieves a color (2) by being heated to a second specified temperature higher than the first specified temperature and then being cooled.

In particular, substances which change their property such as transparency, translucency, color tone or other color states by being heated to a first specific temperature or a second specific temperature higher than the first temperature are preferably used because temperatures and hence their color states can be easily controlled. Specific examples of these substances include a system which includes a resin and a long-chain low-molecular-weight compound such as a fatty acid dispersed in the resin, and which achieves a transparent state at a first specified temperature and achieves an opaque state at a second specified temperature (JPA-55-154198), a system using a specific resin and a fatty acid or the like, which achieves an opaque state at a first specified temperature and achieves a transparent state at a second specified temperature (JPA-3-169590), a system using a leuco dye and a long-chain alkyl developer, which colors black, red, blue or the like after being heated to a second specified temperature and discolors at a first specified temperature (JPA-5-124360, 5-294063 and 6-171225), and a system using a leuco dye and an amphoteric developer, which colors at a first specified temperature and discolors at a second specified temperature (JPA-2-188293 and 2-188294).

Of these substances or systems, those using a leuco dye and coloring black, red, blue or the like can preferably be employed because of having high contrast. Among the systems using a leuco dye, a system using a long-chain alkyl developer is desirable because the temperatures of coloring and discoloring can readily be controlled. Systems including a resin and a low-molecular-weight organic substance such as a fatty acid dispersed in the resin, which achieves a transparent state at a first specified temperature and achieves an opaque state by being heated to a second specified temperature, can more preferably be used. This is because these systems have advantages of satisfactory storage stability, a high sensitivity and satisfactory durability, since the change is a physical change, whereas the change of the systems using a leuco dye is a chemical change.

The reversible thermosensitive recording material which includes a matrix resin and a low-molecular-weight organic substance dispersed in the matrix resin, and which achieves a transparent state at a first specified temperature and achieves an opaque state after being heated to a second specified temperature, will now be explained in detail. This material utilizes changes of transparency (a transparent state and an opaque state), and the difference between the transparent state and the opaque state is considered to be as follows: (I) When the material is transparent, particles of the low-molecular-weight organic substance dispersed in the matrix resin contact closely to the matrix resin, without significant gaps, and the inside of the particles has no significant voids. Accordingly, light incident upon the material from one side passes through the material without significant scattering, and hence the material looks transparent. (II) When the material is opaque, particles of the low-molecular-weight organic substance include fine crystals, and there are gaps at interfaces between the individual crystals or boundary surfaces between the particles and the matrix resin. Light incident upon the material from one side is refracted and scattered at interfaces between the gaps and the crystals and between the gaps and the matrix resin, and therefore the material looks opaque.

Figure 2:
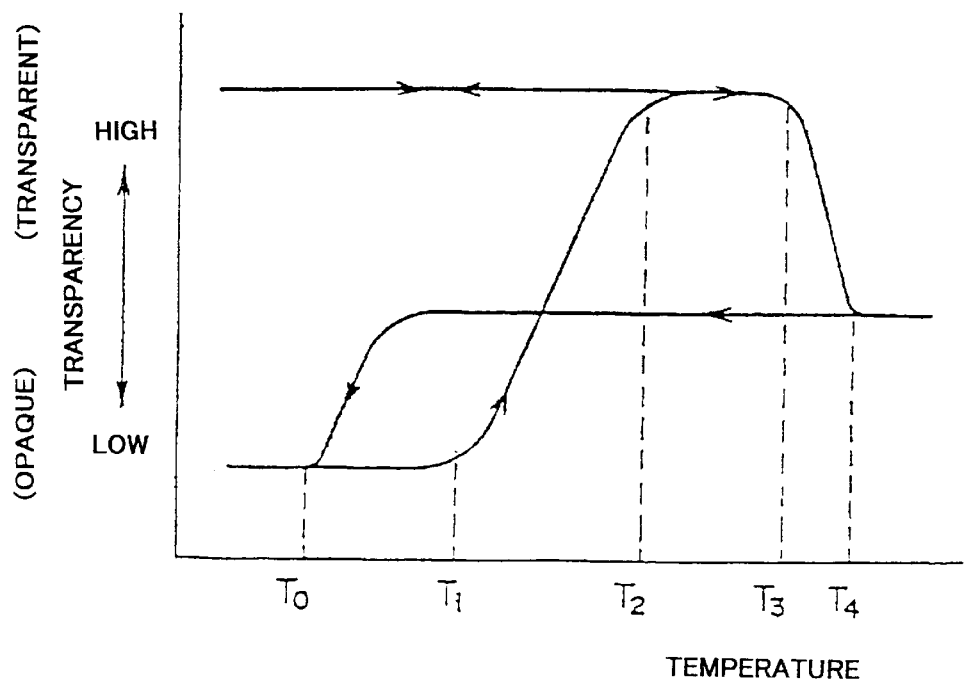
FIG. 2 contains a graph illustrating the change of the transparency of a reversible image recording layer by heat.

FIG. 2 illustrates changes of transparency depending on the temperature of a reversible thermosensitive recording material. In this figure, the reversible thermosensitive recording material containing, as major ingredients, a matrix resin and a low-molecular-weight organic substance dispersed in the matrix resin is in an opaque state at room temperature equal to or lower than $T_0$. By heating the material, it gradually becomes transparent from a temperature $T_1$, and highly transparent at temperatures ranging from $T_2$ to $T_3$, and once it achieves the transparent state, it remains transparent even after being cooled to room temperature equal to or lower than $T_0$. This is probably because the resin starts to soften in the vicinity of the temperature $T_1$, and thereby the resin shrinks, and therefore the gaps between the matrix resin and the low-molecular-weight organic substance particles or voids in the particles and are decreased, resulting in an increase of the transparency of the material. At a temperatures ranging from $T_2$ to $T_3$, the low-molecular-weight organic substance achieves a half molten state, the molten substance fills remained gaps and thereby the material becomes transparent. When the material in this state is cooled, seed crystals that still remain crystallize at a relatively high temperature, but the resin follows the volume changes of the particles due to crystallization, and therefore the formation of gaps is avoided and the transparent state can be maintained. When the material is heated up to a temperature $T_4$ or higher, it achieves an intermediate semi-transparent state between the maximum transparent state and the maximum turbid state. When the temperature is then lowered, the material returns to the initial opaque state without achieving the transparent state. The reason is considered to be that when the low-molecular-weight organic substance is completely molten at the temperature $T_4$ or higher and then cooled, it achieves a supercooled state and crystallizes at a temperature somewhat higher than $T_0$. In this stage, the resin cannot follow the volume changes due to crystallization and hence gaps are formed. FIG. 2 illustrates only a typical temperature-transparency change curve, and is not limiting. The transparency or other properties at each stage may change depending on the materials used.

Preferred resins for use in the reversible thermosensitive recording material have a glass transition temperature ranging from 60° C. to 120 ° C. and more preferably from 70° C. to 100° C. Specific examples of such resins include polyvinyl chlorides, vinyl chloride-vinyl acetate copolymers, vinyl chloride-vinyl acetate-vinyl alcohol copolymers, vinyl chloride-vinyl acetate-maleic acid copolymers, vinyl chloride-acrylate copolymers and other vinyl chloride-based copolymers; polyvinylidene chlorides, vinylidene chloride-vinyl chloride copolymers, vinylidene chloride-acrylonitrile copolymers and other vinylidene chloride-based copolymers; polyesters; polyamides; polyacrylates, polymethacrylates, or acrylate or methacrylate copolymers; silicone resins, polyethylenes, polypropylenes, polystyrenes, polyacrylamides, polyvinyl pyrrolidones, natural rubbers, polyvinyl alcohols, polyacroleins, and polycarbonates. These resins can be used singly or in combination of two or more.

Of these resins preferred are polyvinyl chlorides, vinyl chloride-vinyl acetate copolymers, vinyl chloride-vinyl acetate-vinyl alcohol copolymers, vinyl chloride-vinyl acetate-maleic acid copolymers, vinyl chloride-acrylate copolymers and other vinyl chloride-based copolymers. These resins may preferably be crosslinked by, preferably, heat, ultraviolet rays, and electron beams for enhancing durability when repeatedly used. Various crosslinking agents can be used in this crosslinking step. When heat crosslinking is performed, a resin having a hydroxyl group such as vinyl chloride-vinyl acetate-vinyl alcohol copolymer is crosslinked with a material having an isocyanate group; and when ultraviolet crosslinking and electron beam crosslinking are performed, an acrylic or methacrylic monomer or oligomer is used together with a resin to be crosslinked. The methods or materials are, however, not limited thereto.

Any known materials, combination of materials and agents, and crosslinking processes as described in, for example, JPA-64-62368, 3-227688, 7-96679 and 7-172072 can be employed as the resins, crosslinking agents and crosslinking processes in the disclosed product and process.

Any known low-molecular-weight organic substances which become particulate in the reversible thermosensitive recording layer can be employed in the disclosed product and process. In general, those having a melting point ranging from about 30° C. to about 200° C. and preferably from about 50° C. to about 200° C. are used. Long-chain hydrocarbon-containing compounds, which contain a long-chain hydrocarbon group, are desirable as the low-molecular-weight organic substance. The long-chain hydrocarbon group may preferably have from 6 to 50 carbons, more preferably from 8 to 40 carbons and even more preferably from 10 to 30 carbons. A plurality of hydrocarbon groups may be included in one molecule. In this case, the number of carbons as mentioned above means the total carbon number of hydrocarbon groups in a molecule.

It is preferable to use a combination of a low-molecular-weight organic substance having a relatively low melting point (hereinafter briefly referred to as "low-melting-point substance") and a low-molecular-weight organic substance having a relatively high melting point (hereinafter briefly referred to as "high-melting-point substance") as the low-molecular weight organic substances. The difference in melting point between the low-melting-point substance and the high-melting-point substance is preferably equal to or more than 30° C., more preferably equal to or more than 40° C. and even more preferably equal to or more than 50° C. The combined use of low-molecular-weight organic substances having different melting points enlarges a temperature range in which the material becomes transparent.

The low-melting-point substance preferably has a melting point equal to or higher than 50° C., more preferably equal to or higher than 70° C. and even more preferably equal to or higher than 80° C. The melting point is preferably lower than 100° C. The heat resistance or thermal stability of the image increases as the melting point of the low-melting-point substance increases. The high-melting-point substance preferably has a melting point ranging from 100° C. to 200° C., more preferably from 130° C. to 180° C. and even more preferably from 140° C. to 170° C. As the melting point of the high-melting-point substance increases, the difference in melting points between the high-melting-point substance and the low-melting-point substance increases and hence the temperature range in which the material becomes transparent widens. Therefore, the material can easily become transparent even when the process speed is increased. On the contrary, the sensitivity of image formation is enhanced with the decrease of the melting point of the high-melting-point substance.

Specific examples of the low-melting-point substances include, but are not limited to, fatty acid esters, dibasic acid esters, di-fatty acid esters of polyhydric alcohol, ketones each having a higher alkyl group, fatty acids, alkyl-substituted amides and alkyl-substituted ureas. These substances can be used singly or in combination of two or more.

Specific examples of the high-melting-point substances include saturated aliphatic dicarboxylic acids, semicarbazones derived from ketones each having a higher alkyl group, α-phosphonofatty acid, fatty acid amides, aliphatic bisamides, alicyclic dicarboxylic acids, fatty acids having a steroid skeleton. Of these compounds, those described in the following publications are desirable but are not limited thereto. The can be used alone or in combination of two or more.

Any known low-molecular-weight organic substances and combinations thereof can be used in the invention, including those described in JPA-2-1363, 3-2089, 5-77549, 5-96850, 5-124343, 5-294062, 6-48024 and 8-20167.

The proportion of the low-melting-point substance to the high-melting-point substance preferably ranges from 95:5 to 5:95 by weight, more preferably from 90:10 to 10:90 by weight and even more preferably from 80:20 to 20:80 by weight.

The proportion of the low-molecular-weight organic substance to the resin in the reversible thermosensitive recording layer preferably ranges from 2:1 to 1:16 by weight, more preferably from 1:2 to 1:8 by weight and even more preferably from 1:2 to 1:4 by weight. When the proportion of the resin is below the above range, it can be difficult to form a film in which the low-molecular-weight organic substance is contained in the resin, whereas when it exceeds the range, the material cannot achieve an opaque state due to an insufficient amount of the low-molecular-weight organic compound.

The reversible thermosensitive recording layer may further include any additives such as surfactants and plasticizers, to enhance the formation of a transparent image. Specific examples of such additives for use in the disclosed product and process include, but are not limited thereto, those described in JPA-63-104879 and 63-178079.

The reversible thermosensitive recording material using a leuco dye and a long-chain alkyl developer, which can color and discolor, will now be explained in detail. Such a reversible thermosensitive recording material can be obtained by dispersing a leuco dye and a developer in a resin binder. Suitable leuco dyes for use in the recording material include triphenylmethane phthalide compounds, fluoran compounds, phenothiazine compounds, leucoauramine compounds, indolinophthalide compounds and the like.

Suitable developers for use in the recording material include compounds in which a moiety capable of developing a leuco dye, such as a phenolic hydroxyl group, carboxyl group or phosphoryl group, and a moiety capable of controlling the cohesive force between the molecules, such as a long-chain hydrocarbon group, are connected in the molecule. The connection part may include a divalent group having a heteroatom, and the long-chain hydrocarbon group may include a divalent group having a heteroatom or an aromatic group. Specific examples of such compounds include known developers the compounds disclosed in, for example, JPA-5-124360.

The developer preferably has a melting point ranging from 120° C. to 200° C. and more preferably from 140° C. to 180° C.

Figure 3:
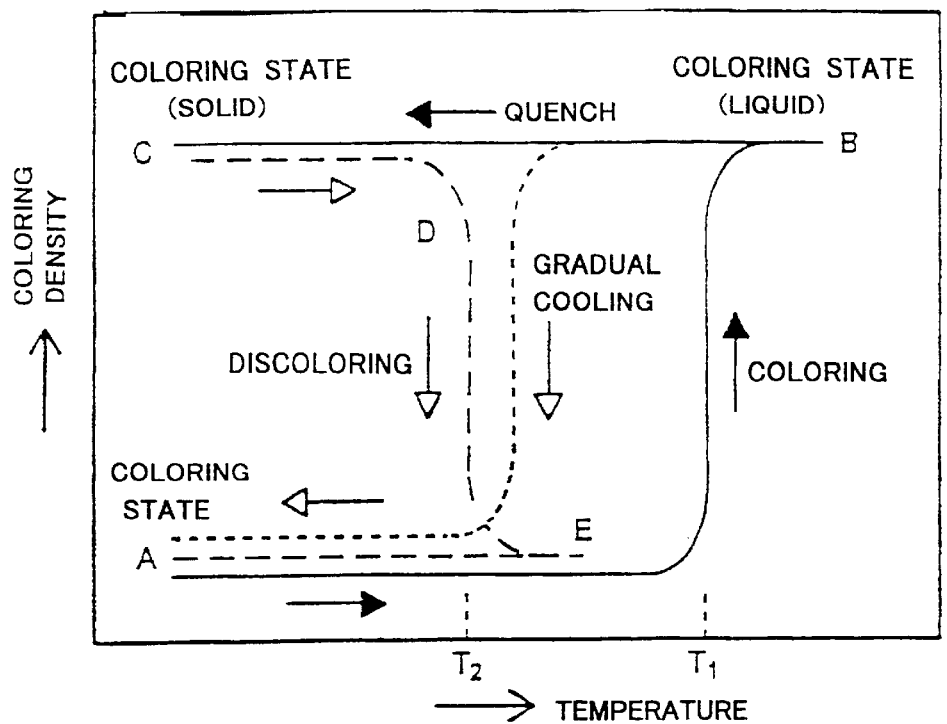
FIG. 3 illustrates the change of the color tone of a reversible image recording layer by heat.

FIG. 3 illustrates the relationship between the coloring density and temperature of this composition. The composition is initially in a discolored state (A). When the composition is heated, the composition achieves a melted and colored state (B) at a temperature $T_1$ at which the composition begins to melt. When the composition is rapidly cooled from the melted and colored state (B), the composition can be cooled to room temperature while maintaining the colored state, thus achieving a solidified colored state (C). The achievement of this colored state (C) depends on the speed of cooling from the melted state. If the composition is cooled gradually, it discolors during the cooling process and achieves the discoloring state (A), which is the same as the initial state or a state in which the color density is relatively lower than that of the rapidly cooled colored state (C). When the composition in the rapidly cooled colored state (C) is heated again, it discolors at a temperature $T_2$ which is lower than the coloring temperature (broken line D to E). When the composition is cooled again from this state, it returns to the discolored state (A), which is the same as the initial state.

The reversible image recording layer can be provided integrally with a substrate and an optical data storage layer, both in disc form according to the following process steps: a process of providing the reversible image recording layer on one side of the support and an adhesive layer or a pressure-sensitive adhesive layer on the other side of the support to form a label which can reversibly display and record information (a reversible image recording transfer label) and applying the label onto the disc (FIG. 4), a process of providing a reversible image recording layer on a support, providing an adhesive layer thereonto, where desired, bonding the adhesive layer with the disc and removing the support from the disc to transfer the reversible image recording layer to the disc (FIGS. 5A and 5B), and a process of disposing a composition for forming a reversible image recording layer directly on the disc. FIG. 5A illustrates the disc before transferring the reversible image recording layer with the use of the reversible image recording transfer label 20, and FIG. 5B illustrates the disc after transferring the reversible image recording layer and then removing the support from the disc.

The process of applying a label to the disc is advantageous in that the label serves as a heat insulating layer and prevents heat being transmitted from the reversible image recording layer to the substrate and that the label itself can be applied in a large area to thereby be produced at a low cost. The label preferably has an adhesive force equal to or more than 2.0 kg/cm$^2$ as determined according to the method described in Japanese industrial Standards (JIS). In addition, the process of transferring the reversible image recording layer to the disc and the process of applying a composition for forming a reversible image recording layer to the disc are advantageous, since the overall thickness of the medium can be decreased and fluctuation in rotation speed of the disc can be minimized when the substrate is disc-shaped.

Figure 6A:
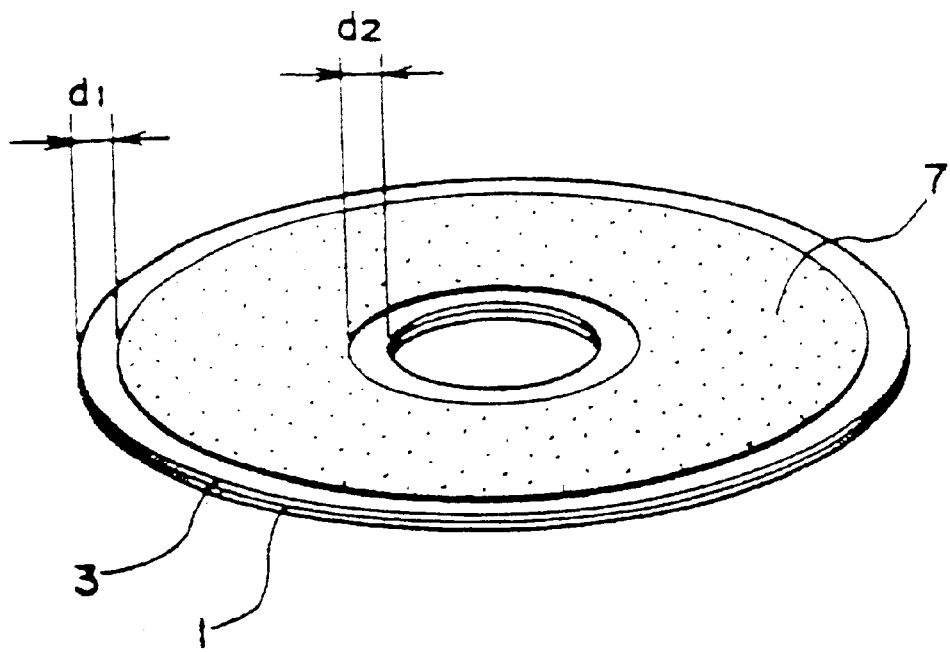
FIGS. 6A and 6B illustrate layer positions of a substrate and a reversible recording layer.
Figure 6B:
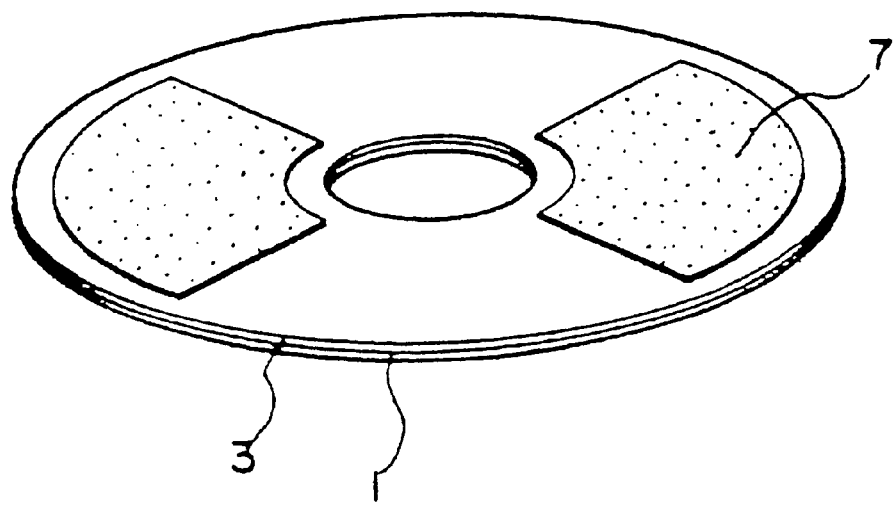

FIGS. 6A and 6B illustrate embodiments in which the substrate is disc-shaped. Referring to FIG. 6A, the reversible image recording layer is provided in doughnut shape. The reversible image recording layer is preferably provided in an inner area spaced inwardly from the outer periphery of the disc, with distance $d_1$ therebetween. The distance $d_1$ is preferably equal to or more than 0.5 mm and more preferably equal to or more than 1.0 mm. In addition, the recording layer is formed preferably in an area spaced outwardly from the inner periphery of the disc, with a distance $d_2$ therebetween. The distance $d_2$ is preferably equal to or more than 0.5 mm and more preferably equal to or more than 1.0 mm. When the gaps between the reversible image recording layer and either the outer or inner peripheries of the disc are small, the reversible image recording layer may readily peel off from the disc.

When the substrate is disc-shaped, the reversible image recording layer is not necessarily formed in doughnut shape, and it may be formed in portions, e.g., as illustrated in FIG. 6B. In this case, respective portions of the layer are preferably formed symmetric with respect to the center of the disc.

When the reversible image recording layer is formed of a material which changes reversibly between the transparent state and opaque state, a light reflecting layer is preferably provided on the back side of this layer to enhance the contrast. The light reflecting layer can be a reflective dielectric layer serving also as a dielectric layer for the recording medium. This configuration simplifies the structure of the medium and saves time for preparing the medium.

Figure 4:
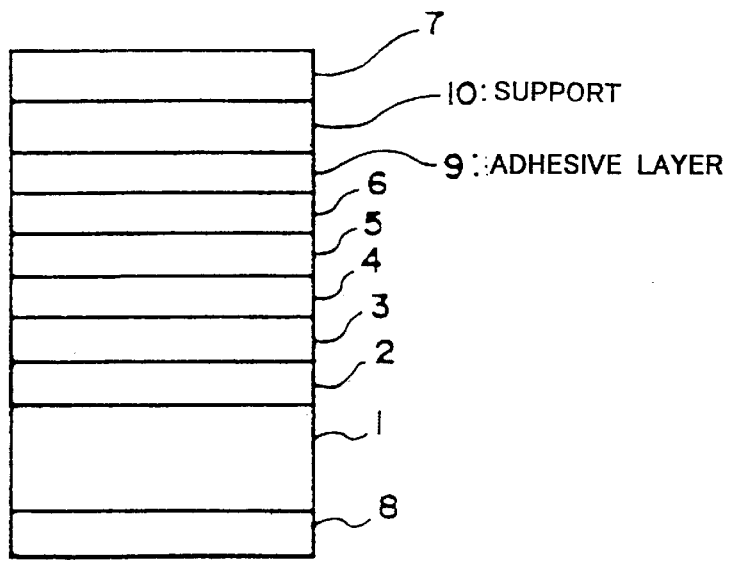
FIG. 4 illustrates a layered structure of another embodiment of the optical data storage medium.
Figures 5A, 5B:
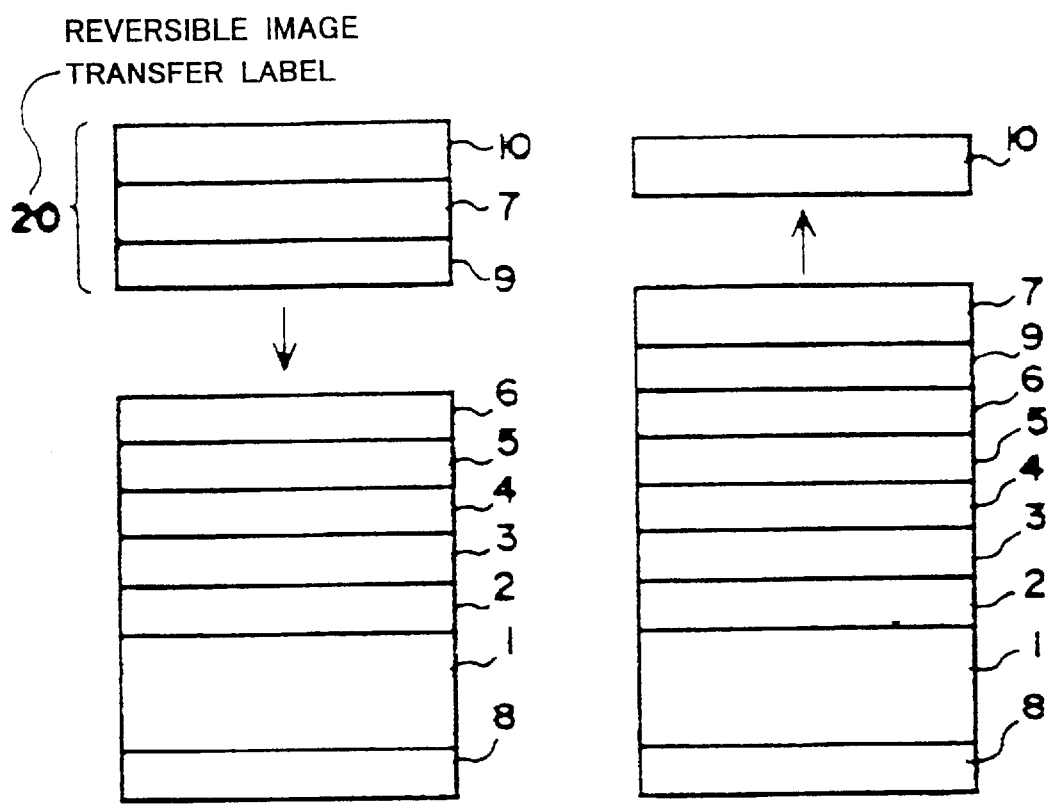
FIGS. 5A and 5B illustrate the fabrication of an optical data storage medium according to still another embodiment.

A light reflecting layer can also be provided between the reversible image recording layer 7 and the support 10, or between the support 10 and the adhesive layer 9 of FIG. 4, or between the reversible image recording layer 7 and the adhesive layer 9, or between the adhesive layer 9 and the intermediate layer 6 of FIGS. 5A and 5B. The light reflecting layer may be formed by, for example, vapor deposition of metal such as Al, Ni or Sn.

Examples of materials of the adhesive layer 9 include, but are not limited to, urea resins, melamine resins, phenol resins, epoxy resins, vinyl acetate resins, vinyl acetate-acrylic copolymers, ethylene-vinyl acetate copolymers, acrylic resins, polyvinyl ether resins, vinyl chloride-vinyl acetate copolymers, polystyrene resins, polyester resins, polyurethane resins, polyamide resins, chlorinated polyolefin resins, polyvinyl butyral resins, acrylate copolymers, methacrylate copolymers, natural rubbers, cyanoacrylate resins and silicone resins. The adhesive layer 9 can be composed of a hot-melt material. When a label is used, either a label with release paper or one without release paper may be employed.

The support used in the reversible image recording label includes, but is not limited to, polyimide films, aramid films, polyphenyl sulfide films and polyester films, for example. The support preferably has a thickness ranging from 3 to 250 μm, more preferably from 10 to 150 μm and further preferably from 20 to 100 μm.

A protective layer is preferably formed on the reversible image recording layer for protecting the latter layer from mechanical stress or damage. The protective layer is particularly useful for protecting the surface of the layer from being damaged by heat and mechanical stress when the recording layer is heated by contact with a thermal printhead, for example. The protective layer preferably has a thickness ranging from 0.1 to 20 μm and more preferably from 0.5 to 10 μm. The protective layer is preferably composed of resins such as thermosetting resins, ultraviolet curing resins, electron-beam curing resins and other similar setting resins. The resins can include silicone rubbers, silicone resins (JPA-63-221087), polysiloxane-graft polymers (JPA-63-317385), ultraviolet curing or electron beam curing resins (JPA-2-566).

The protective layer is usually formed by printing or coating. When a solvent is used in coating, a solvent that does not easily dissolve the resin and low-molecular-weight organic substance in the recording layer is preferred. The protective layer may further comprise a lubricant for reducing the frictional coefficient of its surface. It may also comprise an organic or inorganic filler for further roughening its surface. A resin-based layer can be provided between the protective layer and the reversible image recording layer for enhancing adhesion therebetween.

Figure 7:
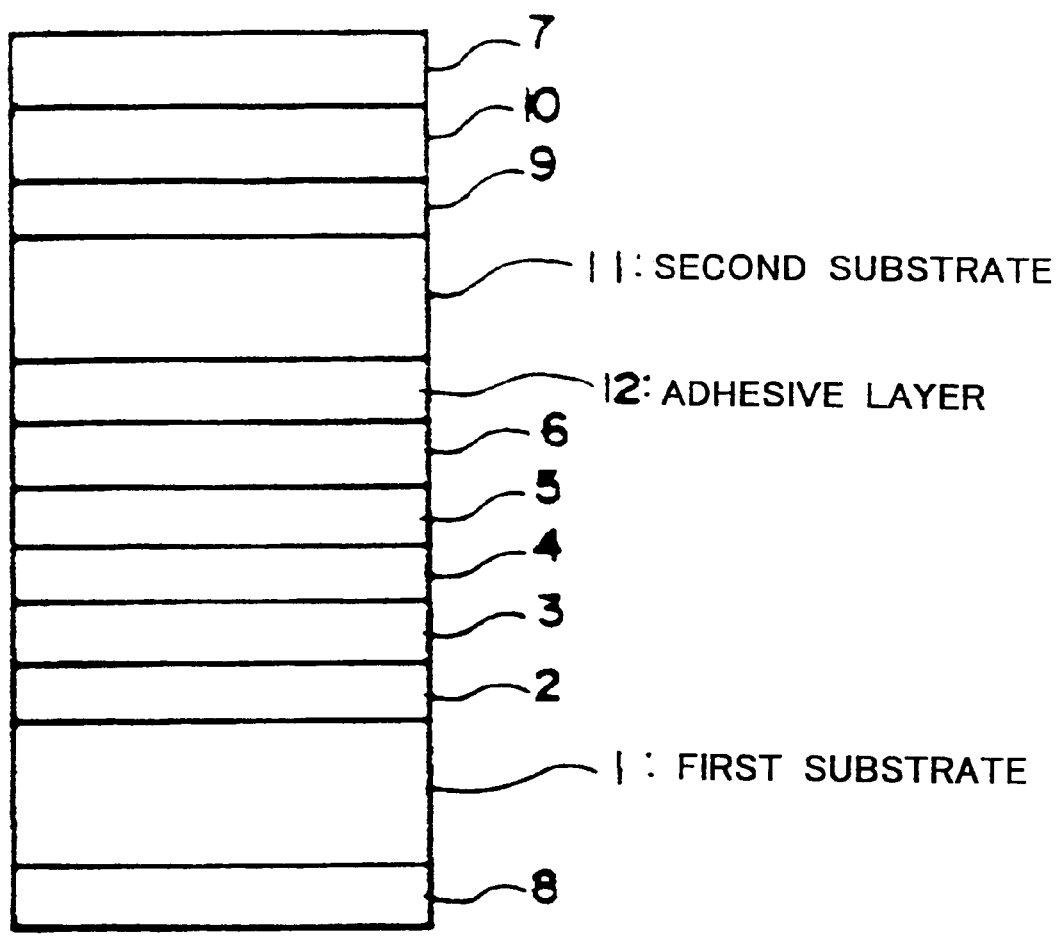
FIG. 7 illustrates a layered structure of an optical data storage medium according to another embodiment.

The recording medium disclosed herein can be integrally composed of two compositional substrates as for DVDs. FIG. 7 illustrates an embodiment of such a configuration. This medium is integrally fabricated of a first substrate 1', an optical data storage layer 3, a second substrate 11 and a reversible image recording layer 7, in this order. The aforementioned processes and materials can be applied for integrally providing the reversible image recording layer 7.

The reversible image recording layer is preferably a reversible recording layer which changes its transparency or color tone by heat, as described above. The substrate is preferably composed of a resin, and the glass transition temperature Tg of the substrate and the recording temperature Tr of the reversible image recording layer has preferably the following relationship (1), more preferably (3), and further preferably (4).

$$Tr = 1.6 \times Tg \quad (1)$$

$$Tr = 1.5 \times Tg \quad (3)$$

$$Tr = 1.4 \times Tg \quad (4)$$

When the recording temperature Tr of the recording layer is too high, the substrate can deform and thus deform the entire disc. This can adversely affect the incidence and reflection of a laser beam, which can deteriorate the readout and writing of stored information. On the contrary, too low a recording temperature can deteriorate the heat resistance of formed images.

The term "recording temperature" of the reversible image recording layer used herein refers to a temperature of forming an image or that of erasing the image, whichever is the higher. The recording temperature Tr is determined by a heating process as follows: A test sample is heated with a thermal gradient tester (HG-100, TOYOTEC Co., Ltd., Japan). This tester is equipped with five heating blocks and individual blocks can respectively be controlled in temperature, heating period and pressure, to thereby be able to heat simultaneously at five different temperatures using this tester. The heating is carried out for 1 second, from a low temperature at which the transparency or color tone of a sample does not change, to a temperature at which the transparency or color tone sufficiently changes, by steps of from 1° C. to 5° C. The heating can be made with an interposed thin film of 10 μm or less in thickness composed of a polyimide or polyamide having a satisfactory heat resistance, for preventing adherence to the heating block. When uneven heating occurs between the heating block and the optical information storage medium with the reversible image recording layer, the recording layer may be heated after removing the latter layer from the medium. When the sample is rapidly cooled after heating by heating blocks, this cooling can be made by contacting to metal, or by immersing in cold water or liquid nitrogen.

After heating in the above manner, the sample is cooled to room temperature, and subjected to measurements of optical densities at positions heated at respective temperatures, using a MacBeth reflection densitometer RD-914. The measured values are plotted with the set temperature of the thermal gradient tester as the abscissa and the reflection density the ordinate, as illustrated in FIGS. 8A, 8B and 8C.

When the reversible image recording layer changes between the transparent state and the opaque state and when a light absorbing sheet or a light-reflecting sheet is placed on the back of the tested sample, the density may be measured in that arrangement. However, when the reversible image recording layer is removed from the substrate, or the recording layer has only a transparent support, the density can be measured with a light reflecting layer attached to the back of the recording layer. After plotting densities at individual temperatures, a graph is obtained by drawing straight lines between adjacent plotted points. The recording temperature, Tr, can be read from this graph.

Figure 8A:
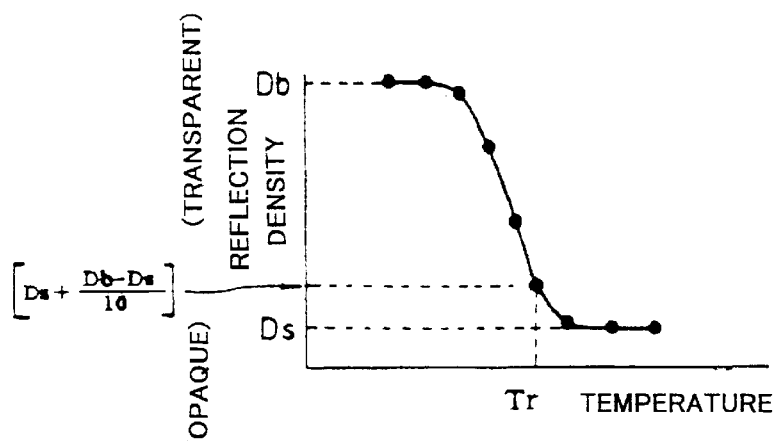
FIG. 8A illustrates the change in reflective density with temperature of a reversible image recording layer which switches between a transparent state and an opaque state, and becomes opaque at a high temperature.
Figure 8B:
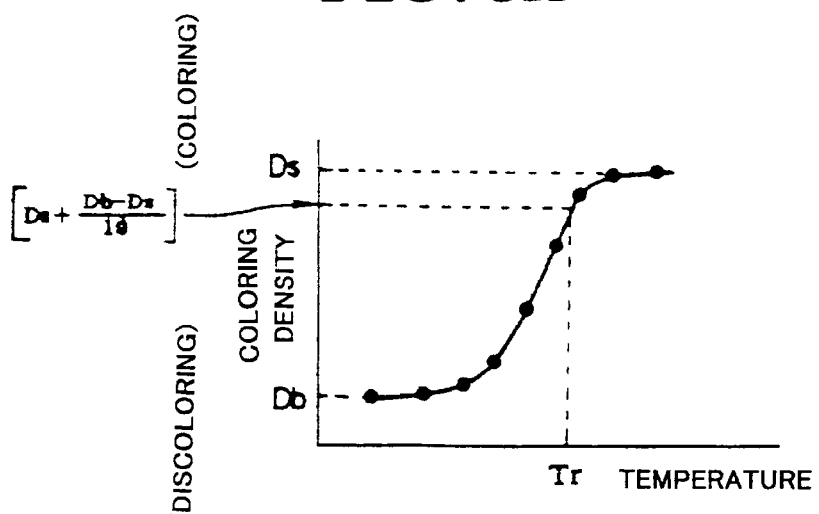
FIG. 8B illustrates the change in coloring density with temperature of a reversible image recording layer which colors at a high temperature.
Figure 8C:
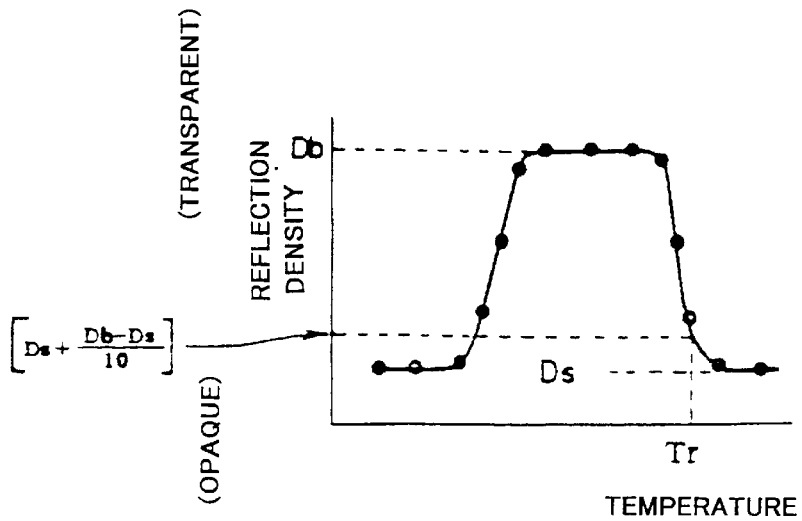
FIG. 8C illustrates the change in reflective density of a reversible image recording layer which changes its transparency with temperature.

FIG. 8A graphically illustrates the results when a reversible image recording layer which switches between the transparent state and the opaque state and becomes opaque at a high temperature, is heated in the aforementioned manner. The recording temperature Tr is the temperature at a point of intersection of the line of the density defined as follows and the plotted curve (FIG. 8A). The density D is defined by the following equation:

$$D = Ds + \{(Db - Ds)/10\}$$

wherein Ds is a saturated recording density and Db is a background density. When the recording layer is of the type which becomes colored at a high temperature, the density change is shown in FIG. 8B, which is upside down with respect to the graph in FIG. 8A, whereas the definition of the recording temperature Tr is the same as in FIG. 8A. FIG. 8C illustrates a graph for a recording layer which changes its transparency or color tone with temperature. It graphically illustrates the measured densities when the reversible image recording layer which becomes transparent at a low temperature and opaque at a high temperature, as illustrated in FIG. 2, is heated to a given temperature and then cooled to room temperature. In this case, the recording temperature Tr is defined as the temperature at which the recording layer becomes opaque at a high temperature, as described above. The same definition can be applied to a reversible image recording layer which discolors at a low temperature and colors at a high temperature, although its graph is not shown. The reversible image recording layer preferably has a recording temperature Tr ranging from 120° C. to 200° C. and more preferably from 130° C. to 180° C.

The glass transition temperature Tg of the substrate and the recording temperature Tr of the reversible image recording layer has preferably the following relation:

$$Tr \leq 1.3 \times Tg \times \{(Lr + Ld)/(Lr + 0.8 \times Ld)\} \quad (2),$$

wherein Tr is the recording temperature (° C.) of the reversible image recording layer, Tg is the glass transition temperature (° C.) of the substrate, Lr is the thickness (μm) of the reversible image recording layer, and Ld is the distance (μm) from the face of the substrate facing the reversible image recording layer to the face of the reversible image recording layer facing the substrate.

The distance Ld is important if the recording layer is heated for only a short time. When the recording layer is heated for a long time, heat is transferred to the substrate and the temperature of the substrate rises in the same manner as the surface. On the contrary, when the substrate is heated for a short time, only the vicinity of the surface is heated and the degree of temperature increase is decreased with increasing the distance from the surface. This phenomenon is more evident when the recording layer is heated by laser beam irradiation, in which the heating is carried out for at most for 500 μs, or at most 100 μs. In addition, the distance Ld has some effect in a heating process using a thermal printhead, where the heating time is at most 2 ms or 1 ms, although the effect is not as great as in heating with a laser beam.

The aforementioned relation is more preferably as represented by the relationship(5), and further preferably by (6):

$$Tr \leq 1.2 \times Tg \times \{(Lr+Ld)/(Lr+0.8 \times Ld)\} \quad (5)$$

$$Tr \leq 1.15 \times Tg \times \{(Lr+Ld)/(Lr+0.8 \times Ld)\} \quad (6).$$

When the recording temperature Tr of the recording layer is too high, the substrate can deform and thereby deform the entire disc and affect incidence and reflection of a laser beam adversely, which deteriorates readout and writing of stored information. On the contrary too low a recording temperature deteriorates the heat resistance of the image. For setting the recording temperature Tr of the reversible image recording layer within the above ranges, the material thereof should preferably satisfy the following conditions: When the reversible image recording material is a material which is principally composed of a matrix resin and a low-molecular-weight organic substance dispersed in the resin base and becomes transparent at a first given temperature and becomes opaque after heated to a second given temperature, it is preferable that at least part of the low-molecular-weight organic substance comprises a substance having a melting point equal to or lower than 1.6 times the glass transition temperature Tg of the substrate. More preferably, two or more low-molecular-weight organic substances differing in melting points by 30° C. or more are used as the low-molecular-weight organic substances.

When a reversible image recording material utilizing a coloring reaction between an electron-donating coloring compound and an electron-accepting compound is used, the electron-accepting compound preferably contains, at least partially, an electron-accepting compound having a melting point equal to or higher than 120° C. and equal to or less than 1.6 times the glass transition temperature Tg of the substrate.

As described earlier, the distance Ld is that from the face of the substrate facing the recording layer to a face of the recording layer facing the substrate. In the present embodiment, the distance is from the interface between the substrate 1 and the first dielectric layer 2 to the boundary face between the recording layer 7 and the intermediate layer 6 in the embodiment of FIG. 1; a distance from the interface between the substrate 1 and the first dielectric layer 2 to the interface between the recording layer 7 and the support 10 in the embodiment of FIG. 4; a distance from the interface between the substrate 1' and the first dielectric layer 2 to the interface between the recording layer 7 and the adhesive or pressure-sensitive adhesive layer 9 in the embodiment of FIG. 5B; and a distance from the interface between the second substrate 11 and the adhesive or pressure-sensitive adhesive layer 9 to the interface between the recording layer 7 and the support 10.

The optical data storage medium disclosed herein preferably has a warping angle equal to or less than ±0.6 degree, and a warping range equal to or less than 0.4 mm. The terms "warping angle" and "warping range" are defined and measured as follows: When a completely flat disc is clamped, the plane of the disc is defined as a standard plane. The warping angle is then defined as the maximum angle among the angles between tangents to all the planes of a tested disc and the standard plane. The warping range is defined as the distance between the standard plane and a position of the tested disc which is farthest from the standard plane. When the warping angle or warping range exceeds the above-mentioned ranges, an incident light cannot return to a pickup after being reflected by the disc, and stored information cannot be read out. In addition, a beam spot deforms in a writing step and a satisfactorily shaped pit cannot be formed, thereby hindering readout of the stored data or information.

The optical data storage medium disclosed herein is preferably composed of a disc-shaped substrate and has a deviation of the center of gravity of less than 2.5 gr.mm. This deviation is represented by a value obtained by multiplying the weight (g) of the disc by the distance (mm) between the center of the disc and the center of the gravity of disc. When the deviation exceeds the above range, fluctuation of a disc in a high-speed reproduction increases to inhibit reproduction.

It is preferable that at least part of the visually recognizable information stored in the optical data storage layer and recorded on the reversible image recording layer is displayed with a bar code.

In the case where a reversible thermosensitive recording material is used, which comprises a matrix resin and a low-molecular-weight organic substance dispersed in the matrix resin, and becomes transparent at a first given temperature and becomes opaque after heated to a temperature, the contrast in readout of the bar code is further enhanced when the average particle size of the particles of low-molecular-weight organic substance ranges from ⅛ to 2 times the wavelength of a light source used in readout of the bar code. Although the reasons for this phenomenon have not been clarified yet, they are considered to be as follows: The degree of opacity, that is, the scattering degree of light is presumably determined depending on the size of crystals and on the volume of inside voids, both in the low-molecular-weight organic substance. The size of crystals and the volume of inside voids are presumably determined depending on the particle size of the low-molecular-weight organic substance. This is probably because the particle sizes of the low-molecular-weight organic substance determine the area of the interface between the matrix resin and the low-molecular-weight organic substance dispersed therein, and this area of the interface determines the intensity of interaction between the resin base and the low-molecular-weight organic substance, and, in turn, the intensity of interaction affects the size of crystals in the particles.

There are certain specific sizes of crystals which maximally scatter a light of a certain wavelength. The sizes differ according to individual materials, and in general, crystals having sizes less than the wavelength of a light scatter the light of this wavelength. In other words, when the average particle size of the low-molecular-weight organic substance ranges from ⅛ to 2 times the wavelength of the light used for reading the bar code, the sizes of individual crystals in the low-molecular-weight organic substance in the opaque state are in the size range to maximally scatter light of that wavelength. When the average particle size is less than ⅛ the wavelength of the light for reading, the scattering effect, the opacity and hence the contrast decrease. On the contrary, when it exceeds two times the wavelength, the surface area of the interface between the matrix resin and the low-molecular-weight organic substance and hence the interaction therebetween decrease so as to make it difficult to control the crystals in the particles of the low-molecular-weight organic substance. Further, the opacity and hence the contrast decrease. The control of particle sizes of the low-molecular-weight organic substance can be achieved by, but not limited to, mixing a poor solvent into the material, controlling a heating and drying step during the coating of a composition for the formation of the recording layer, or addition of a surfactant for controlling the dispersibility.

The wavelength of a light source for reading a bar code is prescribed as equal to or more than 600 nm (JIS B9550), and in general, a light source having a wavelength ranging from 600 nm to 1000 nm is employed. As such light sources, light-emitting diodes (LEDs) of 660 nm or 940 nm in wavelength, or lasers including He-Ne laser of 600 nm in wavelength or semiconductor lasers of 680 nm, 780 nm or 960 nm in wavelength are used in practice.

The bar code displayed in the reversible image recording layer of the invention can be read using a light source having a wavelength equal to or longer than 600 nm, and it can also be read using a light source having a shorter wavelength. A higher contrast can be obtained using a light source having a shorter wavelength rather than a longer wavelength. By way of illustration, the use of light having a wavelength of 400 to 600 nm provides a contrast at maximum about 2-fold than that of a light having a wavelength of 600 nm to 10000 nm. This is probably because a light having a shorter wavelength has a greater refractive index, which results in increased scattering of light and hence enhanced opacity.

The term "bar code" used herein refers to a matter or means by which an optical change such as intensity of light or change of wavelength can be recognized as a piece of information, regardless of whether it is in the range of wavelengths of visible light, and, accordingly, further includes other optically-recognizable pattern-indicators such as two-dimensional bar codes, optical character recognition (OCR) systems and color codes.

As described above, a light-reflecting layer is preferably provided on the back of the recording layer when a reversible thermosensitive recording layer which switches between the transparent state and the opaque state is used as the recording layer of the optical data storage medium disclosed herein. The reflective/heat dissipating layer 5 illustrated in FIGS. 1, 4, 5 and 6 can also serve as the light-reflecting layer. In this case, the gloss in the transparent state as measured from the surface of the recording layer is preferably equal to or more than 150%, further preferably equal to or more than 200% and typically preferably equal to or more than 250%, as determined according to the method described in ASTM D523 (60° gloss measurement). The displaying contrast increases with an increasing gloss. In addition, the gloss is preferably equal to or less than 700%, and more preferably equal to or less than 600%. Although an increasing gloss results in an increasing contrast, it may also result in regular reflection of light and make it hard to see at some viewing angles. The gloss can be controlled by regulating the flatness or roughness of the surface of the light-reflecting layer.

Accordingly, the surface of the recording layer in the optical data storage medium of the invention preferably has a ten-point-average roughness (Rz) of 0.3 to 3.0 $\mu$m as measured according to JIS B0601, and an arithmetic mean deviation of profile (Ra) of 0.05 to 1.0 $\mu$m as measured according to JIS B0601. When the surface of the storage medium has a suitable roughness, it does not adhere to a thermal printhead when it comes in contact with the thermal printhead, and is heated so as to smoothen the relative motion between the thermal printhead and the storage medium and to enhance the evenness of an image. On the contrary, an excessively roughened surface causes an excessively lowered gloss of the surface and diminished contrast of an image.

The storage medium disclosed herein may preferably include a reversible recording area and an irreversible recording area, both of which are formed on parts of the surface of the optical data storage medium. With this configuration, frequently rewritten information such as a date of the latest rewriting of information or a title of a rewritten file can be displayed and recorded in the reversible displaying and recording areas, whereas information which requires no rewriting such as a serial number of the medium or a name of owner can be displayed and recorded in the irreversible recording area, thereby enhancing the convenience for users.

Information can be recorded in the irreversible display and record area by, but not limited to, ink-jet recording, thermal transfer recording or electrophotographic recording. Of these techniques, ink-jet recording and thermal transfer recording are preferred, since the equipment that is involved can be miniaturized. The ink-jet recording technique is advantageous in that it does not deform the optical storage medium, since recording is conducted without contact, by ejecting an ink. The thermal transfer recording technique is advantageous in that the equipment can be miniaturized and slimmed further, since the same thermal printhead can be used for recording on the reversible image recording area.

When information is recorded on the irreversible recording area by ink-jet technique, the irreversible display and record area preferably has a hydrophilic surface to which a water-based ink can be fixed. Therefore, the irreversible display and record area is preferably composed of a material containing a hydrophilic resin. An organic or inorganic filler may also be incorporated therein for enhanced immersing of a water-based ink.

Such a hydrophilic surface to which a water-based ink can be fixed may be formed by, for example, printing, coating, or applying a label having a hydrophilic surface.

As hydrophilic resin films for enhancing printability such as wettability of an ink and affinity for water, there may be mentioned films formed of at least one resin among polyethylene oxides, polyvinyl alcohols, polyvinyl methyl ethers, polyvinyl formals, carboxylvinyl polymers, hydroxyethyl cellulose, hydroxypropyl cellulose, methyl cellulose, sodium carboxymethyl cellulose, polyvinyl pyrrolidones and morpholine. The hydrophilic material may further comprise an additive, for preferred example, any of water-absorbing pigments, wetting agents, defoaming agents and surfactants.

The thermal transfer techniques can be broadly divided into a melting thermal transfer recording technique using principally a pigment or dye and a wax or resin, and a sublimation thermal transfer recording technique using principally a sublimating dye. In a melting thermal transfer recording technique, the nature of the surface of a target material is not specifically limited, and an image can be formed, for example, on the reversible image recording layer or on the protective layer formed thereon. When a sublimation thermal transfer recording technique is employed, it is preferable to provide an accepting layer which can accept a sublimating dye on the intermediate layer or on the protective layer. An adhesive layer may be formed between the accepting layer and the intermediate layer or protective layer.

The dye-accepting layer can be formed of any of dyeing resins such as polyesters, cellulose esters, polycarbonates, polyvinyl chlorides, which are generally used for dye-accepting layers of printing papers for sublimation thermal transfer recording. It is preferable that the accepting layer is formed of an intercalation compound which can fix a cationic dye by an ion exchange reaction, and a resin binder, and that a cationic dye is used as the dye in the sublimation thermal transfer recording. When thermal transfer recording is conducted on a dye-accepting layer composed of an intercalation compound using a cationic dye, the thermally-transferred cationic dye is captured between layers of the intercalation compound of the dye-accepting layer, to give a dye-image having a satisfactory fixing property or durability.

Examples of the intercalation compounds used for the dye-accepting layer include compounds described in Paragraphs 13–17 of JPA-4-299183. Typically, clay intercalation compounds having ion-exchange properties such as montmorillonitic minerals can advantageously be employed.

Figure 9:
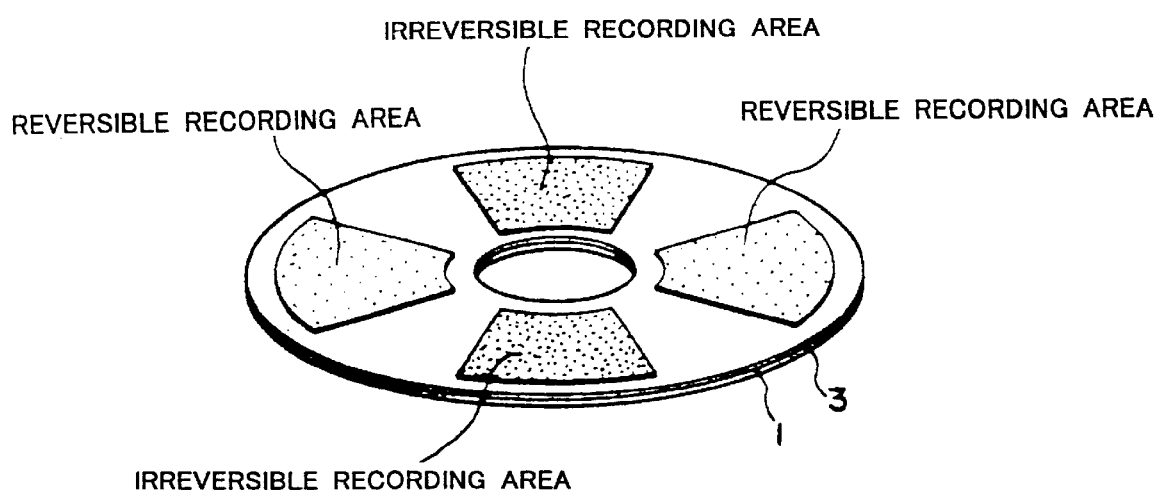
FIG. 9 illustrates an embodiment of the optical data storage medium which is provided thereon with a reversible image recording area and irreversible image recording area according to another embodiment.

When the substrate is disc-shaped, the reversible image recording areas and the irreversible display and record areas are preferably formed symmetric with respect to the center of the disc, as illustrated in FIG. 9.

The process for displaying and recording on the optical data storage medium comprises providing an optical data storage medium being integrally composed of a substrate, an optical data storage layer and a reversible image recording layer in this order, irradiating the medium with a laser beam to store and/or rewrite optically readable information or data on the medium, and recording and/or rewriting at least part of the stored and/or rewritten information on the reversible image recording layer to render the information visually recognizable.

The information to be rewritten, displayed and recorded includes, but not limited to, titles, file names, used memory, available memory, creating dates of files, updating dates and times of files, file formats, and other optional images.

When a reversible thermosensitive recording layer which changes its transparency or color tone by heat is used as the reversible image recording layer, at least part of the stored information in the optical information storage layer is recorded and/or rewritten on the reversible image recording layer to render the information visually recognizable.

The recording and/or rewriting step in this process may preferably be conducted at a temperature equal to or lower than 1.6 times the glass transition temperature Tg of the substrate.

The recording and/or rewriting temperature Tr (° C.) may preferably have the following relation with the glass transition temperature Tg (° C.) of the substrate:

$$Tr \leq 1.3 Tg \times \{(Lr+Ld)/(Lr+0.8 \times Ld)\}$$

wherein Lr is the thickness ($\mu$m) of the reversible image recording layer, and Ld is the distance ($\mu$m) from a face of the substrate facing the reversible image recording layer to the face of the reversible image recording layer facing the substrate.

The techniques for reversibly displaying and recording information on the reversible image recording layer can be divided into a technique of forming an image by one means and erasing the image by another means respectively, and a technique of forming and erasing an image by an identical heating means. In the technique of forming an image by one means and erasing the image by another means respectively, the means for forming an image includes, for example, a thermal printhead and a laser, and the other means for erasing the image includes, for instance, hot stamping, ceramic heaters, or thermal printhead or laser different from that used as the image-forming means.

When an image is formed and erased by the same heating means, thermal printheads and lasers, for example, are used. By forming and erasing an image with one heating means, the equipment can be miniaturized. A so-called overwriting recording technique can also be employed. In this technique, the temperatures of individual heaters of a thermal printhead are respectively controlled, and the heaters are heated to a temperature at which all recorded image can be erased, and simultaneously a portion to form an image is heated to a temperature at which an image can be formed. Therefore, erasing of a previous image and forming of a new image can be conducted in a single operation.

When the substrate includes a reversible recording area and an irreversible recording area, both on the side where the optical information storage layer is formed, a material containing at least a dye or pigment is attached to the irreversible display and record area to form an image. The irreversibly recorded information includes, for example, but is not limited to, a serial number of the medium, and multicolor images such as photographs and pictures which are difficult to form by the reversibly displaying and recording technique.

In this process, it is preferable that a water-based ink is attached to the irreversible recording area by an ink-jet recording technique to form an image.

It is also preferable that a material containing at least a pigment or dye is attached to the irreversible recording area by a thermal transfer recording technique to form an image. When the irreversible displaying and recording is done by thermal transfer recording technique and the reversible displaying and recording is carried out by recording information on a reversible image recording area, the recording may preferably be carried out in the following manner: Using an identical thermal printhead for the formation of an image, a thermal transfer ribbon is placed to record information by thermal transfer recording, and the ribbon is removed and the thermal printhead is directly pressed to the surface of the reversible image recording layer of the optical data storage medium to record information by reversibly displaying and recording in response to heat.

The disclosed product and process will now be described in more detail with reference to the following examples. Quantities are by weight unless otherwise indicated.

EXAMPLES

Example 1

Onto a 1.2mm thick polycarbonate substrate having grooves 0.5 $\mu$m wide and 35 nm deep were successively formed a first dielectric layer, an optical information storage layer, a second dielectric layer, and a reflective/heat-dissipative layer, in this order, with a sheet-type sputtering apparatus at a 10 second cycle time. The first dielectric layer was mainly composed of Zn, S, Si and O and formed so as to have a thickness of 120 nm. The optical information storage layer was mainly composed of Ag, In, Sb and Te, incorporated with 1% by weight each of N and O, and formed so as to have a thickness of 30 nm. The second dielectric layer was mainly composed of Zn, S, Si and O, which were the same as those in the first dielectric layer, and formed so as to have a thickness of 40 nm. The reflective/heat-dissipative layer was formed with an Al alloy so as to have a thickness of 100 nm. Successively, a hard coat was formed with an ultraviolet crosslinking resin on the surface of the substrate by spin coating, and then an intermediate layer (about 5 μm) was formed with an ultraviolet crosslinking resin on the surface of the sputtered layers by spin coating. Thus a phase-change optical disc was prepared.

The disc was subjected to crystallization treatment of the optical information storage layer with an initializing apparatus having a large-diameter laser diode (LD), under conditions to ensure a reflectance of 95% or more of the saturated reflectance.

A label having a reversible thermosensitive recording layer which repeatedly achieves a transparent state and an opaque state upon application of heat was then prepared by the following method.

Onto a transparent 50 μm thick aramid film (ARAMICA SOR; Asahi Chemical Industry Co., Ltd., Japan) substrate, Al was deposited in vacuo to form a light-reflecting layer about 600 Angstroms in thickness. Separately, a vinyl chloride-vinyl acetate-phosphate copolymer (DENKA VINYL #1000 P; Denki Kagaku Kogyo K.K., Japan) was dissolved in a mixture of methyl ethyl ketone (MEK) and toluene (1:1), and the resultant solution was applied onto the light-reflecting layer and dried by heating to form an adhesive layer having a thickness of about 1 μm. Onto this adhesive layer was applied a solution having the following composition and the resultant film was heated and dried to form a layer about 10 μm in thickness.

Composition

Behenic acid 9 parts (a reagent manufactured by Sigma Co., Ltd., purity of 99%)
1,4-Ciscyclohexyldicarboxylic acid 0.5 part (a reagent manufactured by Tokyo Kasei K.K., Japan)
1,4-Transcyclohexyldicarboxylic acid 0.5 part (a reagent manufactured by Tokyo Kasei K.K., Japan)
Vinyl chloride-vinyl acetate-vinyl alcohol copolymer 27 parts (VAGH; Union Carbide Corp., USA)
Isocyanate compound 3 parts (CORONATE HL; Nippon Polyurethane Co., Ltd., Japan)
Tetrahydrofuran (THF) 250 parts
Toluene 20 parts The resultant film was allowed to stand at 60° C. for 24 hours to crosslink the resins and thereby a heat reversible display and record layer was formed.

A coating composition including 10 parts of a 75% solution of a urethane-acrylate ultraviolet crosslinking resin in butyl acetate (Unidic C7-157; Dainippon Ink & Chemicals, Inc., Japan), 1 part of calcium carbonate (Brilliant 15; Shiraishi Kogyo K.K., Japan) and 10 parts of toluene was prepared by dispersing the ingredients uniformly. The coating composition was applied onto the reversible thermosensitive recording layer with a wire bar, and then crosslinked with an ultraviolet lamp of 80 W/cm, to form a protective layer of about 3 μm in thickness. The recording temperature (a temperature at which the layer achieves an opaque state) of the reversible thermosensitive recording layer was 150° C.

An acrylic adhesive layer of about 5 μm in thickness was formed on the back side of the substrate, which was opposite to the side on which the reversible thermosensitive recording layer was formed, to prepare a heat reversible display and record label.

This label was formed into a doughnut shape and adhered onto the aforementioned disc as shown in FIG. 6A, to prepare an optical information storage medium of the invention capable of reversibly displaying information.

Example 2

An optical information storage medium capable of reversibly displaying information was prepared in a manner similar to that in Example 1, except that the coating composition for the reversible thermosensitive recording layer was replaced with the following composition. The resultant reversible thermosensitive recording layer had a recording temperature (a temperature at which the layer achieves an opaque state) of 175° C.

Composition

Methyl lignocerate 7.5 parts (a reagent manufactured by Tokyo Kasei K.K., Japan)
Deoxycholic acid 2.5 parts (a reagent manufactured by Tokyo Kasei K.K., Japan)
Vinyl chloride-vinyl acetate-vinyl alcohol copolymer 27 parts (VAGH; Union Carbide Corp., USA)
Isocyanate compound 3 parts (CORONATE HL; Nippon Polyurethane Co., Ltd., Japan)
Tetrahydrofuran (THF) 250 parts
Toluene 20 parts Example 3

An optical information storage medium capable of reversibly displaying information was prepared in a manner similar to that in Example 1, except that the coating composition for the reversible thermosensitive record layer was replaced with the following composition. The resultant reversible thermosensitive recording layer had a recording temperature (a temperature at which the layer achieves an opaque state) of 132° C.

Composition

Behenic acid 5 parts (a reagent manufactured by Sigma Co., Ltd., purity of 99%)
Icosadioic acid 5 parts (SL-20-90; Okamura Oil Mfg., Japan)
Vinyl chloride-vinyl acetate-vinyl alcohol copolymer 27 parts (VAGH; Union Carbide Corp., USA)
Isocyanate compound 3 parts (CORONATE HL; Nippon Polyurethane Co., Ltd., Japan)
Tetrahydrofuran (THF) 250 parts
Toluene 20 parts Example 4

The procedure of Example 1 was repeated to prepare an optical information storage medium capable of reversibly displaying information, except that a 25 μm thick aramid film (ARAMICA 25R; Asahi Chemical Industry Co., Ltd., Japan) was used as the substrate of the reversible thermosensitive recording label.

Example 5

A reversible thermosensitive recording layer was formed onto a substrate in a manner similar to that in Example 1, except that the adhesive layer and protective layer on the light-reflecting layer and the adhesive layer on the back of the reversible thermosensitive recording label were not provided. Onto the heat reversible display and record layer was formed an adhesive layer in the same manner as in Example 1. This adhesive layer was placed on the optical information storage layer side of the disc to transfer the reversible thermosensitive recording layer to the disc as illustrated in FIGS. 5A and 5B. Then a protective layer was formed on the reversible thermosensitive recording layer in a manner similar to that in Example 1 to prepare an optical information storage medium capable of reversibly displaying information.

Example 6

An optical information storage medium capable of reversibly displaying information was prepared in the following manner:

The composition for the formation of the reversible thermosensitive recording layer in Example 1 was directly applied onto an intermediate layer of a disc using a die head, and the coated liquid was heated and dried to form an about 10 μm thick layer, followed by allowing it to stand at 60° C. for 24 hours to crosslink the resins. Thus, a reversible thermosensitive recording layer was prepared. Onto the recording layer was formed a protective layer in a manner similar to that in Example 1 to prepare an optical data storage medium capable of reversibly displaying image information.

Example 7

An optical information storage medium capable of reversibly displaying information was prepared in a manner similar to that in Example 1, except that an acrylic resin was used as the substrate. Comparative Example 1

A phase-transition optical disc was prepared in a manner similar to that in Example 1, except that the label was not provided and a reversibly-recording function was not provided to the disc. The disc was then subjected to crystallization treatment.

Each of the optical information storage media prepared in Examples 1–7 and Comparative Example 1 was subjected to a test mentioned below:

Information such as dates and times, which had been stored by a CD-RW drive (MP 6200S; Ricoh Co., Ltd., Japan), was recorded in the reversible thermosensitive recording layer to be visualized, using a recording equipment having a recording device (a thermal printhead) and an erasing device (a ceramic heater), while adjusting each recording energy of the thermal printhead depending on the recording temperature of each medium. Subsequently, the information stored in the optical information storage layer of the optical information storage medium was rewritten using the aforementioned drive; the previous information formed in the recording layer was erased using the erasing device of the recording equipment; and the information which was the same as the information stored in the medium was then recorded in the reversible thermosensitive recording layer using the thermal printhead. This information rewriting procedure was repeated 100 times.

The disc was then subjected to measurement of a warping angle by a mechanical property measuring apparatus (LM-100; Ono Sokuki K.K., Japan).

The readout of each disc was evaluated using a signal evaluator (CD-CATS; Audio Development Inc.) to obtain 3T Pit jitter. The amount of jitter is preferably not greater than 35 nm. The term "jitter" used herein means a degree of uncertainty of edges of pits. A signal of a CD can have nine different lengths from 3T to 11T based on its pit length. Its pulse length should theoretically accord with each of the standard lengths, but lengths of individual pulses are, in actuality, irregular and positions of edges exhibit a certain distribution. On the assumption that the distribution is a normal distribution, the difference between the standard position and the actual position is called as a "deviation", and the variance (σ) of the normal distribution of the positions of edges is the jitter. A clock for identifying data in the information reproduction process of a CD is derived from a reproducing signal, and a transition point from 0 to 1 or from 1 to 0 fluctuates due to the jitter in positional relation between the clock of input in a signal processing circuit and the signal passed through the processing circuit. When this fluctuated transition point is formed on the startup of the clock, an error occurs. In other word, the probability of errors increases as jitter increases.

When the warping angle increases, a beam for writing does not enter in a direction perpendicular to the disc, and a proper amount of light can not be supplied to the optical information storage layer and hence it becomes difficult to form a proper pit. In addition, a reflected beam does not properly return to a pickup. Both cases result in increase of jitter.

The warping angles and 3T pit jitter as measured, the glass transition temperature Tg of the substrate, the recording temperature Tr, the distance Ld from the face of the substrate facing the reversible thermosensitive recording layer to the face of the reversible thermosensitive recording layer facing the substrate of each of the above optical information recording media are shown in Table 1.

Table 1 also demonstrates the warping angle 3T Pit Jitter as measured and the glass transition temperature Tg of the substrate of the optical information storage medium prepared in Comparative Example 1, in which a reversible thermosensitive recording layer was not provided and layers up to the intermediate layer were provided. In this medium, the stored information was not displayed because the medium had no reversible thermosensitive recording layer, and accordingly heating for recording was not performed.

TABLE 1

| | Glass transition temperature of substrate Tg (° C.) | Recording temperature Tr (° C.) | Ld (μm) | Warping angle (deg) | 3T pit jitter (ns) |
|---|---|---|---|---|---|
| Example 1 | 130 | 150 | 65 | 0.2 | 26 |
| Example 2 | 130 | 175 | 65 | 0.3 | 27 |
| Example 3 | 130 | 132 | 65 | 0.2 | 26 |
| Example 4 | 130 | 150 | 40 | 0.3 | 25 |
| Example 5 | 130 | 150 | 10 | 0.3 | 27 |
| Example 6 | 130 | 150 | 10 | 0.3 | 26 |
| Example 7 | 105 | 180 | 65 | 0.6 | 25 |
| Comparative example 1 | 130 | — | — | 0.2 | 25 |

Example 8

An optical information storage medium capable of reversibly displaying information was prepared in a manner similar to that in Example 1, except that 2 parts of calcium carbonate instead of 1 part was used in the protective layer.

Example 9

The procedure of Example 1 was repeated to prepare an optical information storage medium capable of reversibly displaying information, except that 1.5 parts of silica (S-64; Fuji-Devison Ltd.) was used instead of 1 part of calcium carbonate in the protective layer.

Example 10

An optical information storage medium capable of reversibly displaying information was prepared in a manner similar to that in Example 1, except that 2 parts of silica (S-244; Fuji-Devison Ltd.) was used instead of 1 part of calcium carbonate in the protective layer.

Example 11

The procedure of Example 1 was repeated to prepare an optical information storage medium capable of reversibly displaying information, except that calcium carbonate was not incorporated in the protective layer.

Each of the optical information storage media prepared in Example 1 and Examples 8–11 was subjected to a test mentioned below:

Character image information such as dates and times, which was stored in the medium with a CD-RW drive (MP 6200S; Ricoh Co., Ltd., Japan), was recorded in the reversible thermosensitive recording layer to be visualized, using the same recording equipment having a recording device (a thermal printhead) and an erasing device (a ceramic heater), which is mentioned above. Arithmetical Mean Deviation of the Profile (Ra) and Ten-Point-Mean Roughness (Rz) of the surface of each medium, the uniformity of image which was evaluated by visual inspection of the formed image, the opaque image density and transparent background density which were measured by a reflection densitometer (MacBeth RD 914) and the image contrast of the image formed in individual media are shown in Table 2.

TABLE 2

| | Arithmetical mean deviation of profile (Ra: μm) | Ten-point-average roughness (Rz: μm) | Image uniformity | opaque image density | Transparent background density | Image contrast |
|---|---|---|---|---|---|---|
| Example 1 | 0.20 | 1.34 | ○ | 0.27 | 1.38 | 5.1 |
| Example 8 | 0.27 | 1.95 | ○ | 0.26 | 1.33 | 5.1 |
| Example 9 | 0.52 | 2.54 | ○ | 0.25 | 1.30 | 5.2 |
| Example 10 | 1.12 | 3.55 | ○~Δ | 0.30 | 0.91 | 3.0 |
| Example 11 | 0.02 | 0.12 | ○ | 0.39 | 1.62 | 4.2 |

○: Good, Δ: Somewhat inferior

Image contrast=Transparent background density/Opaque image density

The media obtained in Examples 10 and 11 were inferior in the uniformity of image and image contrast. The reason is considered to be that the media of Example 10 has an excessively rough surface which inhibits smooth and uniform contact of the thermal printhead and the optical information storage medium; and the optical information storage medium of Example 11 has a flat surface which inhibits smooth traveling of the thermal printhead relative to the medium, and the medium is readily affected by dust thereon.

Example 12

A coating composition was prepared by uniformly dispersing 20 parts of polyvinyl pyrrolidone, 10 parts of polyvinyl butyral, 10 parts of silica (S-244; Fuji-Devison Ltd.) and 60 parts of ethanol. The coating composition was applied onto the parts of the protective layer on the reversible thermosensitive recording layer of the optical information storage medium prepared in Example 1, such that the layer was formed symmetric with respect to the center point of the disc as illustrated in the irreversible information recording area of FIG. 9. The coated liquid was dried at 50° C. for 1 hour to form an irreversible information recording area composed of a 10 μm thick hydrophilic resin film. Thereby an optical information storage medium capable of reversibly displaying information which has an irreversible information recording area and a reversible information recording area was obtained.

Onto the irreversible recording area of this medium was formed a color image using an ink-jet CD color printer "Signature" (a product of FARGO). Next, onto the reversible thermosensitive recording area of the medium on which a hydrophilic resin film was not formed, information was recorded as an opaque image to be visualized, using the aforementioned recording apparatus having a recording device (a thermal printhead) and the erasing device (a ceramic heater). The information included titles of files, dates and times of storing and available memory and had been stored in the medium by a CD-RW drive (MP 6200 S; Ricoh Co., Ltd., Japan). The information stored in the optical information storage layer of the medium was then rewritten using the aforementioned drive, and the previous displayed information on the reversible recording layer was erased to be transparent using the erasing means of the recording apparatus. The rewritten information was newly recorded in the reversible thermosensitive recording layer using the thermal printhead. By rewriting the information in the recording layer accompanied with rewriting of the stored information, the information stored in the disc can be clearly recognized only by seeing the information recorded in the surface of the disc.

The irreversible recording layer was provided over the reversible thermosensitive recording layer in Example 12. In addition, as illustrated in FIG. 9, a reversible information recording area can also be provided on the intermediate layer of the disc using a technique of transferring a heat reversible display and record layer to the disc as demonstrated in Example 5, and an irreversible information recording area can be provided on a part of the remainder surface,.

By providing both an irreversible information recording area and a reversible information recording area on the disc, original designs or figures of users such as titles of the disc itself or optional graphics can be displayed on the irreversible information recording area; and in addition, the information displayed on the reversible information recording area can be rewritten accompanied by the rewriting of the stored information in the disc, and the information stored in the disc can clearly be recognized by the information displayed in the reversible thermosensitive recording area.

Example 13

A color image was formed on a part of the protective layer on the reversible thermosensitive recording layer side of the optical information storage medium prepared in Example 1, using a thermal transfer recording type CD color printer, Perfect Image CD Printer (trade name; manufactured by Rimage Co.).

Example 14

Onto a part of the protective layer of the reversible thermosensitive recording layer side of the optical information storage medium prepared in Example 1 was coated a solution including 5.0 parts of a polyamide resin, 47.5 parts of toluene and 47.5 parts of ethanol by spin coating (condition: high-speed spinning-off of 350 rpm, and time of 60 sec.) to form an adhesive layer of 1 to 2 μm in dried thickness. Onto this layer was coated a solution containing 4 parts of lipophilized clay, 4 parts of a vinyl chloride-vinyl acetate copolymer, 46 parts of toluene and 46 parts of methyl ethyl ketone by spin coating (condition: high-speed spinning-off of 350 rpm, and time of 60 sec.) to form a dye-accepting layer of 2 to 3 μm in dried thickness. Thus, an optical information storage medium capable of reversibly displaying information was prepared.

A color image was then formed on a part of the dye-accepting layer of the above-prepared optical information storage medium by a sublimation thermal transfer recording technique using an ink ribbon including a hydrophobic cationic dye.

Each of the optical information storage media prepared in Examples 13 and 14 was subjected to a test mentioned below:

Onto the reversible thermosensitive recording area of the medium on which a hydrophilic resin film was not formed, information was recorded as an opaque image to be visualized, using the aforementioned recording apparatus having a recording device (a thermal printhead) and an erasing device (a ceramic heater). The information included titles of files, dates and times of storing and available memory and had been stored by a CD-RW drive (MP 6200 S; Ricoh Co., Ltd., Japan). The information stored in the optical information storage layer of the medium was then rewritten using the aforementioned drive, and the previous displayed information on the reversible thermosensitive recording layer was erased to be transparent using the erasing device of the recording apparatus. The rewritten information was newly recorded on the reversible thermosensitive recording layer using the thermal printhead. This recording procedure was satisfactory performed.

The dye-accepting layer was provided over the reversible thermosensitive recording layer in Example 14. In addition, as illustrated in FIG. 9 and explained in Example 12, a reversible thermosensitive recording area can be partially provided on the intermediate layer of the disc using a technique of transferring a heat reversible display and record layer to the disc as demonstrated in Example 5, and an irreversible information recording area can be provided on a part of the remainder surface.

According to the optical information storage medium disclosed herein including a substrate, and an optical information storage layer and a reversible thermosensitive recording layer formed overlying the substrate, details of the stored information can be rewritten in the reversible thermosensitive recording layer to be reliably visualized, and the stored information can readily be recognized even when stored information in the optical information storage layer changes.

This document claims and contains subject matters related to Japanese Patent Application No. 10-213227, filed on Jul. 28, 1998, the entire contents of which are herein incorporated by reference, as are the contents of the JPAs identified earlier in this patent specification. The theories and/or hypothesis of the nature of certain phenomena discussed above are an effort to propose an explanation thereof but further research may disclose other explanations or may show that the explanations currently proposed may turn out to be faulty.

Obviously, additional modifications and variations of the present invention are possible in light of the above teachings. It is therefore to be understood that within the scope of the appended claims, the invention may be practiced otherwise than as specifically described herein.

What is claimed is:

1. An optical data storage medium, comprising:
   a substrate;
   an optical data storage layer overlaid above the substrate; and
   a reversible image recording layer overlaid above the optical data storage layer in a plurality of sections, the respective sections being formed symmetric with respect to a center of the substrate, wherein information is recorded on said reversible image recording layer so as to be visually recognizable.

2. The medium according to claim 1, wherein said reversible image recording layer is thermosensitive.

3. The medium according to claim 2, wherein said reversible image recording layer changes its transparency or color tone in response to heat.

4. The medium according to claim 3, wherein the recording temperature (Tr) of the reversible image recording layer is equal to or higher than about 120° C.

5. The medium according to claim 3, wherein said reversible image recording layer comprises a matrix resin and a low-molecular-weight organic substance dispersed in said matrix resin, and reversibly changes transparency in response to heat.

6. The medium according to claim 5, wherein said low-molecular-weight organic substance comprises a low-molecular-weight organic substance having a melting point equal to or higher than about 100° C. and equal to or lower than 1.6 times the glass transition temperature of the substrate.

7. The medium according to claim 5, wherein said low-molecular-weight organic substance comprises at least two low-molecular-weight organic substances having melting points that differ from each other by at least about 30° C.

8. The medium according to claim 3, wherein said reversible image recording layer comprises an electron donating color-displaying compound and an electron accepting compound which colors the electron donating color-displaying compound in response to heat.

9. The medium according to claim 8, wherein said electron donating compound comprises an electron donating compound having a melting point equal to or higher than about 120° C. and equal to or lower than 1.6 times the glass transition temperature of the substrate.

10. The medium according to claim 2, wherein said substrate has a glass transition temperature (Tg) ranging from about 100° C. to about 180° C.

11. The medium according to claim 1, further comprising a support and an adhesive layer between said reversible image recording layer and said optical data storage layer, wherein said reversible image recording layer is adhered to said optical data storage layer.

12. The medium according to claim 1, wherein said information recorded in the reversible image recording layer comprises a bar code.

13. The medium according to claim 1, including a light-reflecting layer provided between said reversible image recording layer and said optical data storage layer.

14. The medium according to claim 13, wherein the light-reflecting layer has a function of reflecting a laser beam and keeping said optical data storage layer from overheating.

15. An optical data storage medium comprising:
   a substrate;
   an optical data storage layer overlaid above the substrate; and
   a reversible image recording layer overlaid above the optical data storage layer, wherein information is recorded on said reversible image recording layer so as to be visually recognizable, and wherein said reversible image recording layer is thermosensitive and changes its transparency or color tone in response to heat, and wherein said substrate comprises a resin, and a glass transition temperature (Tg) of said resin and a recording temperature (Tr) of said reversible image recording layer have the following relationship:

$$Tr \leq 1.6 \times Tg \quad (1),$$

wherein Tr is a recording temperature (° C.) of the reversible image recording layer and Tg is a glass transition temperature (° C.) of said resin.

16. An optical data storage medium comprising:

a substrate;

an optical data storage layer overlaid above the substrate; and a reversible image recording layer overlaid above the optical data storage layer, wherein information is recorded on said reversible image recording layer so as to be visually recognizable, and wherein said reversible image recording layer is thermosensitive and changes its transparency or color tone in response to heat, and wherein a glass transition temperature (Tg) of the substrate and a recording temperature (Tr) of the reversible image recording layer have the following relationship:

$$Tr \leq 1.3 \times Tg \times \{(Lr+Ld)/(Lr+0.8 \times Ld)\} \quad (2),$$

wherein Tr is a recording temperature (° C.) of the reversible image recording layer, Tg is a glass transition temperature (° C.) of the substrate, Lr is a thickness (μm) of the reversible image recording layer, and Ld is a distance (μm) from the face of the substrate facing the reversible image recording layer to the face of the reversible image recording layer facing the substrate.

17. An optical data storage medium comprising:

a substrate;

an optical data storage layer overlaid above the substrate; and a reversible image recording layer overlaid above the optical data storage layer, wherein information is recorded on said reversible image recording layer so as to be visually recognizable, and wherein a warping angle of the optical data storage medium is equal to or less than ±0.6 degree and has a warping amount of equal to or less than 0.4 mm.

18. An optical data storage medium comprising:

a substrate;

an optical data storage layer overlaid above the substrate; and a reversible image recording layer overlaid above the optical data storage layer, wherein information is recorded on said reversible image recording layer so as to be visually recognizable, and wherein a surface of the optical data storage medium, facing the reversible image recording layer, has a ten-point mean roughness (Rz) ranging from 0.3 to 3.0 μm as determined according to Japanese Industrial Standards (JIS) B0601.

19. An optical data storage medium comprising:

a substrate;

an optical data storage layer overlaid above the substrate; and a reversible image recording layer overlaid above the optical data storage layer, wherein information is recorded on said reversible image recording layer so as to be visually recognizable, and wherein a surface of the optical data storage medium, facing the reversible image recording layer, has an arithmetical mean deviation of the profile (Ra) ranging from 0.05 to 1.0 μm as determined according to Japanese Industrial Standards (JIS) B0601.

20. An optical data storage medium comprising:

a substrate;

an optical data storage layer overlaid above the substrate; and a reversible image recording layer overlaid above the optical data storage layer, wherein information is recorded on said reversible image recording layer so as to be visually recognizable, and wherein said reversible image recording layer is formed overlaying an area of the surface of the optical data storage layer and an irreversible image recording layer is formed overlaying on another area of the surface of the optical data storage layer.

21. The medium according to claim 20, wherein said irreversible image recording layer comprises a hydrophilic surface to which an aqueous-based ink can be fixed.

22. The medium according to claim 20, wherein said irreversible image recording layer has an accepting layer to which an image can be formed and fixed by a thermal transfer recording method.

23. A process for recording information on an optical data storage medium, comprising the steps of:

providing an optical data storage medium including a substrate, an optical data storage layer overlaid above the substrate and a reversible image recording layer overlaid above the optical data storage layer; and recording or rewriting information on said reversible image recording layer to make said information visually recognizable.

24. The process according to claim 23, wherein the reversible image recording layer changes its transparency or color tone in response to heat in the recording step.

25. A process for recording information on an optical data storage medium comprising:

providing an optical data storage medium including a substrate, an optical data storage layer overlaid above the substrate and a reversible image recording layer overlaid above the optical data storage layer; and recording or rewriting information on said reversible image recording layer to make said information visually recognizable, wherein the information is recorded or rewritten on said reversible image recording layer at a temperature equal to or lower than 1.6 times the glass transition temperature of the substrate to make the information visually recognizable in the recording step.

26. A process for recording information on an optical data storage medium comprising:

providing an optical data storage medium including a substrate, and optical data storage layer overlaid above the substrate and a reversible image recording layer overlaid above the optical data storage layer;and recording or rewriting information on said reversible image recording layer to make said information visually recognizable, wherein the information is recorded or rewritten on said reversible image recording layer at a temperature Tr to make said information visually recognizable in the recording step, the temperature Tr (° C.) having the following relationship with a glass transition temperature Tg (° C.) of the substrate:

$$Tr \leq 1.3 \times Tg \times \{(Lr+Ld)/(Lr+0.8 \times Ld)\},$$

wherein Lr is a thickness (μm) of the reversible image recording layer, and Ld is a distance (μm) from the face of the substrate facing the reversible image recording layer to the face of the reversible image recording layer facing the substrate.

27. The process according to claim 23, wherein said medium comprises a reversible image recording layer formed overlaying an area of the surface of said optical data storage layer and an irreversible image recording layer formed overlaying another area of the surface of said optical data storage layer, the process further comprising the step of applying a material containing at least a dye or pigment to said irreversible image recording layer to form an image.

28. A process for recording information on an optical data storage medium comprising:

providing an optical data storage medium including a substrate, an optical data storage layer overlaid above the substrate and a reversible image recording layer overlaid above the optical data storage layer; and recording or rewriting information on said reversible image recording layer to make said information visually recognizable, wherein said medium comprises a reversible image recording layer formed overlaying an area of the surface of said optical data storage layer and an irreversible image recording layer formed overlaying another area of the surface of said optical data storage layer, the process further comprising a step of applying a material containing at least a dye or pigment to said irreversible image recording layer to form an image, and wherein said irreversible image recording layer comprises a hydrophilic surface to which an aqueous-based ink can be fixed, and wherein the aqueous-based ink is applied to said irreversible image recording layer by an ink-jet recording method.

29. A process for recording information on an optical data storage medium comprising:

providing an optical data storage medium including a substrate, an optical data storage layer overlaid above the substrate and a reversible image recording layer overlaid above the optical data storage layer; and recording or rewriting information on said reversible image recording layer to make said information visually recognizable, wherein said medium comprises a reversible image recording layer formed overlaying an area of the surface of said optical data storage layer and an irreversible image recording layer formed overlaying another area of the surface of said optical data storage layer, the process further comprising a step of applying a material containing at least a dye or pigment to said irreversible image recording layer to form an image and wherein said the material applying step is performed by a thermal transfer method.

30. An optical data storage medium, comprising:

a substrate;

an optical data storage layer overlaid above the substrate: and a reversible image recording layer overlaid above the optical data storage layer in a plurality of sections, the respective sections being formed symmetric with respect to a center of the substrate; and an irreversible image recording layer overlaid above the optical data storage layer and including at least one section provided between respective sections of the reversible image recording layer, wherein information is recorded on said reversible image recording layer so as to be visually recognizable.

31. A process for recording information on an optical data storage medium, comprising the steps of:

providing an optical data storage medium including a substrate, an optical data storage layer overlaid above the substrate and a reversible image recording layer overlaid above the optical data storage layer in a plurality of sections, the respective sections being formed symmetric with respect to a center of the substrate; and an irreversible image recording layer overlaid above the optical data storage layer and including at least one section provided between respective sections of the reversible image recording layer;

recording or rewriting information on said reversible image recording layer to make said information visually recognizable.

* * * * *